(12) United States Patent
Donderici et al.

(10) Patent No.: US 9,250,349 B2
(45) Date of Patent: Feb. 2, 2016

(54) OPTIMIZED ARRAYS FOR LOOK AHEAD-OF-BIT APPLICATIONS

(75) Inventors: Burkay Donderici, Houston, TX (US);
Luis E. San Martin, Houston, TX (US);
Michael S. Bittar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 117 days.

(21) Appl. No.: 13/816,608

(22) PCT Filed: Aug. 16, 2010

(86) PCT No.: PCT/US2010/045633
§ 371 (c)(1),
(2), (4) Date: Feb. 12, 2013

(87) PCT Pub. No.: WO2012/023926
PCT Pub. Date: Feb. 23, 2012

(65) Prior Publication Data
US 2013/0141102 A1   Jun. 6, 2013

(51) Int. Cl.
*G01V 3/18* (2006.01)
*G01V 3/30* (2006.01)

(52) U.S. Cl.
CPC ... *G01V 3/18* (2013.01); *G01V 3/30* (2013.01)

(58) Field of Classification Search
CPC ............ G01V 3/18; G01V 3/26; G01V 3/28; G01V 3/30; G01V 3/38; G01V 1/44; G01V 13/00; G01V 3/08; G01V 3/12; G01V 3/20; G01V 3/22; G01V 3/24; G01V 3/34; G01V 3/36; G01V 11/00; G01V 11/002; G01V 9/00
USPC ......... 324/338, 323, 324, 329, 331, 333, 337, 324/339, 343
See application file for complete search history.

(56) References Cited

U.S. PATENT DOCUMENTS

| | | | | |
|---|---|---|---|---|
| 6,044,325 | A | * | 3/2000 | Chakravarthy et al. ............ 702/7 |
| 6,163,155 | A | * | 12/2000 | Bittar ............................ 324/338 |
| 6,216,089 | B1 | | 4/2001 | Minerbo |
| 6,304,086 | B1 | * | 10/2001 | Minerbo et al. ............... 324/338 |
| 7,612,565 | B2 | * | 11/2009 | Seydoux et al. ............... 324/334 |

(Continued)

FOREIGN PATENT DOCUMENTS

| | | |
|---|---|---|
| AU | 2010359365 B2 | 3/2014 |
| NO | WO-02/48744 A1 | 6/2002 |

(Continued)

OTHER PUBLICATIONS

"Australian Application Serial No. 2010359365, First Examiination Report mailed Jun. 4, 2013", 3 pgs.

(Continued)

*Primary Examiner* — Tung X Nguyen
*Assistant Examiner* — David Frederiksen
(74) *Attorney, Agent, or Firm* — Schwegman Lundberg & Woessner, P.A.; Benjamin Fite

(57) ABSTRACT

Various embodiments include apparatus and methods of operation with respect to well logging. Apparatus and methods include a tool having an arrangement of transmitters and receivers to capture a signal from a first region relative to the tool such that signal contributions from a second region relative to the tool are cancelable, based on placement of the transmitters and receivers with respect to each other. Additional apparatus, systems, and methods are disclosed.

48 Claims, 26 Drawing Sheets

(56) References Cited

U.S. PATENT DOCUMENTS

| | | | |
|---|---|---|---|
| 7,663,372 B2* | 2/2010 | Signorelli et al. | 324/343 |
| 2002/0101242 A1* | 8/2002 | Bittar | 324/338 |
| 2004/0000911 A1* | 1/2004 | Morys | G01V 11/002 324/338 |
| 2004/0046559 A1* | 3/2004 | Flanagan | 324/338 |
| 2004/0122595 A1* | 6/2004 | Valero | G01V 1/366 702/11 |
| 2007/0108981 A1* | 5/2007 | Banning-Geertsma et al. | 324/338 |
| 2008/0078580 A1 | 4/2008 | Bittar | |
| 2008/0143336 A1* | 6/2008 | Legendre et al. | 324/339 |
| 2009/0015261 A1* | 1/2009 | Yang et al. | 324/343 |
| 2010/0295547 A1* | 11/2010 | Hall | G01V 3/28 324/339 |
| 2011/0133740 A1* | 6/2011 | Seydoux et al. | 324/338 |

FOREIGN PATENT DOCUMENTS

| | | |
|---|---|---|
| WO | WO-0248744 A1 | 6/2002 |
| WO | WO-2006052458 A2 | 5/2006 |
| WO | WO-2009029517 A2 | 3/2009 |
| WO | WO-2011/043851 A1 | 4/2011 |
| WO | WO-2012023926 A1 | 2/2012 |

OTHER PUBLICATIONS

"Australian Application Serial No. 2010359365, Response filed Feb. 24, 2014 to First Examination Report mailed Jun. 4, 2013", 32 pgs.

"European Application Serial No. 10752467.0, Examination Report mailed Dec. 19, 2013", 4 pgs.

"European Application Serial No. 10752467.0, Response filed Apr. 30, 2014 to Examination Report mailed Dec. 19, 2013", 20 pgs.

"International Application Serial No. PCT/US2010/045633, Response filed Jun. 15, 2012 to Written Opinion mailed Jun. 15, 2011", 6 pgs.

"Malaysian Application Serial No. PI 2013000399, Preliminary Examination Report mailed Apr. 3, 2013", 4 pgs.

"Singaporean Application Serial No. 201300964-2, Search Report mailed May 9, 2014", 9 pgs.

"Singaporean Application Serial No. 201300964-2, Written Opinion mailed May 9, 2014", 10 pgs.

"International Application Serial No. PCT/US2010/045633, International Preliminary Report on Patentability mailed Dec. 18, 2012", 14 pgs.

"International Application Serial No. PCT/US2010/045633, International Search Report mailed Jun. 15, 2011", 4 pgs.

"International Application Serial No. PCT/US2010/045633, Written Opinion mailed Jun. 15, 2011", 8 pgs.

"International Application Serial No. PCT/US2010/045633, Written Opinion mailed Sep. 19, 2012", 7 pgs.

"Singapore Application Serial No. 201300964-2, Response filed Dec. 9, 2014 to Written Opinion mailed May 9, 2014", 4 pgs.

"European Application Serial No. 10752467.0, Office Action mailed Mar. 28, 2013", 2 pgs.

"European Application Serial No. 10752467.0, Response filed Sep. 20, 2013 to Office Action mailed Mar. 28, 2013", 28 pgs.

"Malaysian Application Serial No. PI 2013000399, Office Action mailed Aug. 14, 2015", 3 pgs.

"Singaporean Application Serial No. 201300964-2, Search and Examination Report mailed Jan. 28, 2015", 12 pgs.

* cited by examiner

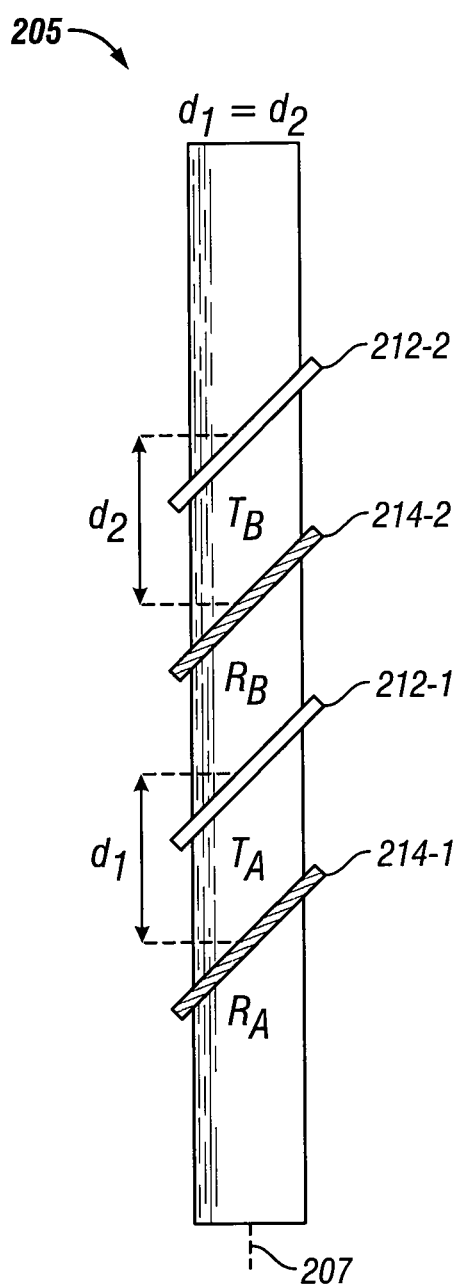
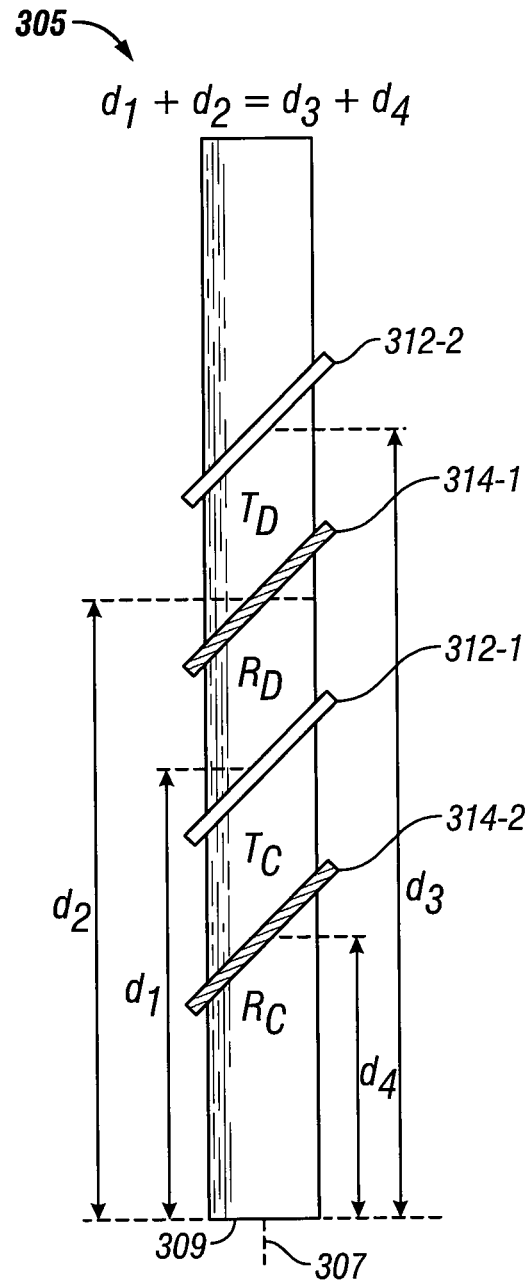
FIG. 2
FIG. 3

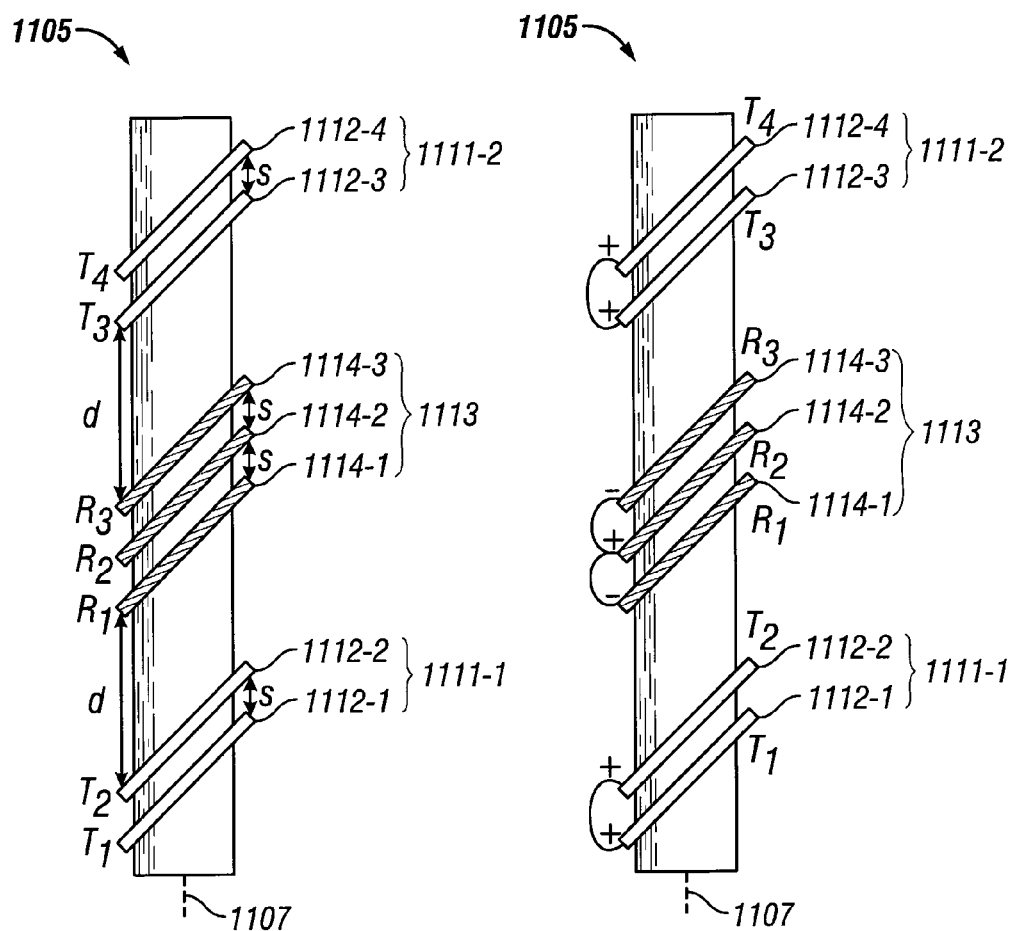
*FIG. 11A*   *FIG. 11B*

OPTIMIZED ARRAYS FOR LOOK AHEAD-OF-BIT APPLICATIONS

RELATED APPLICATIONS

This application is an U.S. National Stage Filing under 35 U.S.C. 371 from International Application No. PCT/US2010/045633, filed on 16 Aug. 2010, and published as WO 2012/023926 A1 on 23 Feb. 2012, which application and publication are incorporated herein by reference in their entirety.

TECHNICAL FIELD

The present invention relates generally to systems having well logging capability.

BACKGROUND

In drilling wells for oil and gas exploration, understanding the structure and properties of the geological formation surrounding a borehole provides information to aid such exploration. However, the environment in which the drilling tools operate is at significant distances below the surface and measurements to manage operation of such equipment are made at these locations. Logging is the process of making measurements via sensors located downhole, which can provide valuable information regarding the formation characteristics. For example, induction logging utilizes electromagnetic signals that can make deep measurements, which are less affected by the borehole and the effects of the zone invaded by the drilling. Most conventional tools are located above the drill motor on the drill string and make measurements from formations that have already been penetrated by the drill bit. Further, the usefulness of such measurements may be related to the precision or quality of the information derived from such measurements.

BRIEF DESCRIPTION OF THE DRAWINGS

FIG. 2 shows an example embodiment of an ahead-of-bit arrangement, according to various embodiments.

FIG. 3 shows an example embodiment of an at-the-tool arrangement of a tool, according to various embodiments.

FIGS. 11A-B show example embodiments of arrangements of transmitters and receivers of a tool applicable for compensated AtT measurement, in accordance with various embodiments.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
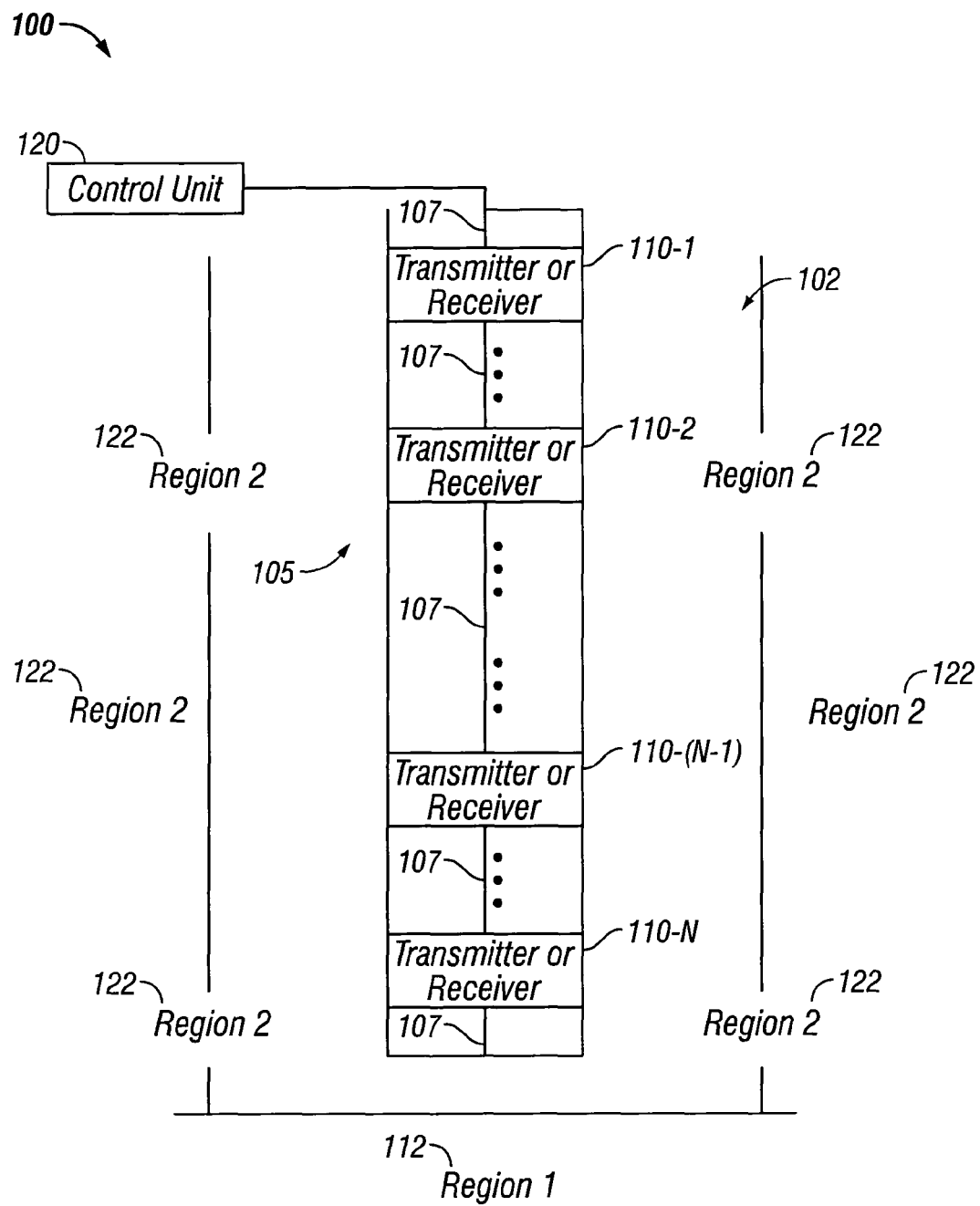
FIG. 1 shows a block diagram of an example embodiment of an apparatus having a tool to make measurements ahead of a drill bit, according to various embodiments.

FIG. 1 shows a block diagram of an embodiment of an apparatus 100 having a tool 105 to make measurements ahead of a drill bit to determine properties downhole in a well 102. Tool 105 can have an arrangement of transmitters and receivers 110-1, 110-2 . . . 110-(N−1), 110-N to capture a signal from a first region 112 relative to a longitudinal axis 107 of tool 105 such that signal contributions from a second region 122 relative to longitudinal axis 107 are cancelable to a maximum extent based on placement of the transmitters and receivers with respect to each other. The arrangement of transmitters and receivers 110-1, 110-2 . . . 110-(N−1), 110-N can be structured to capture a signal from anomalies ahead of tool 105 such that contributions from direct transmitter-to-receiver signals and formation signals around tool 105 are cancelable to a maximum extent. An anomaly is a formation structure having at least one property different from the adjacent or surrounding formation, such as a cavity, a subterranean reservoir, or a different formation layer from the layer surrounding the tool, or such as a well or other borehole. The arrangement of transmitters and receivers 110-1, 110-2 . . . 110-(N−1), 110-N can be structured such that signal contributions from anomalies ahead of tool 105 are cancelable to a maximum extent. In various embodiments, the arrangement of transmitters and receivers 110-1, 110-2 . . . 110-(N−1), 110-N can be structured to capture a signal from around tool 105 such that a horizontal resistivity signal can be decoupled from a vertical resistivity signal to a maximum extent, i.e., substantially decoupled. The arrangement of transmitters and receivers 110-1, 110-2 . . . 110-(N−1), 110-N can be structured to capture a signal from anomalies ahead of tool 105 such that contributions from direct transmitter-to-receiver signals and formation signals around tool 105 are cancelable to a maximum extent and structured such that signal contributions from anomalies ahead of tool 105 are cancelable to a maximum extent, i.e., can be substantially canceled. By canceled to a maximum extent or substantially canceled, it is meant herein that the relevant signals, for example, ahead-of-tool or ahead-of-bit signals and at-the-tool signals, are effectively isolated.

Apparatus 100 can include a control unit 120 to control activation of the transmitters of tool 105 and to process signals received from the receivers in tool 105. Control unit 120 can be located at the surface of well 102 operably in communication with tool 105 via a communication mechanism. Such a communication mechanism can be realized as a communication vehicle that is standard for well operations. Control unit 120 can be distributed along the mechanism by which tool 105 is placed downhole in well 102. Control unit 120 can be integrated with tool 105 such that control unit 120 is operable downhole in well 102. Control unit 120 can be distributed along tool 105. Such embodiments can provide stable and deep evaluation of formations that have not yet been penetrated by the drill bit during a drilling operation, prevention of dangerous situations such as blow-outs, and enhanced recovery of hydrocarbons.

Apparatus 100 can be structured for an implementation in the borehole of a well as a measurements-while-drilling (MWD) system such as a logging-while-drilling (LWD) system. Tool 105 can be located at the drill bit of the drilling operation. Alternatively, apparatus 100 may be configured in a wireline configuration.

In various embodiments, transmitter antennas and receiver antennas can be arranged as a tool for downhole measurements such that some signals can be eliminated in the evaluation of formation properties. Such arrangements can be realized to measure the signal that is coming from ahead of the tool, which is the region ahead of a drill bit, and to cancel the signal that is coming from around the collar where these transmitters and receivers are disposed on the drilling apparatus. The arrangement of such transmitters and receivers allows for focusing ahead by cancelling the field around the collar on which the transmitters and receivers are affixed and measuring the field ahead of the collar. However, such a hardware arrangement does not cancel all of the signals, but cancels the signals to a maximum extent to provide an effectively optimized arrangement of transmitter antennas and receiver antennas. Such an optimized arrangement may cancel signals from a given direction relative to tool with respect to another direction relative to the tool in the range from about 20 percent to 30 percent, which is a significant cancellation (i.e., in this case, substantial cancellation). In order to only evaluate the formation and anomalies with respect to an ahead of the tool signal, the effects of the signal around the tool can be cancelled by an inversion process. Inversion operations can include a comparison of measurements to predictions of a model such that a value or spatial variation of a physical property can be determined. A conventional inversion operation can include determining a variation of electrical conductivity in a formation from measurements of induced electric and magnetic fields. Other techniques, such as a forward model, deal with calculating expected observed values with respect to an assumed model.

To focus on the ahead of the tool formation properties, measurement of the signal from around the tool is made to determine properties of the formation around the tool with contributions from ahead of the tool cancelled to a maximum extent. The measurements at the tool can be applied to an inversion process, where the results of the inversion process are then applied to the inversion of the ahead-of-the-tool signal. Effectively, the tool can be arranged to operate in two modes: ahead-of-the-tool signal acquisition with significant at-the-tool cancellation followed by inversion and at-the-tool acquisition with signification ahead-of-the-tool cancellation followed by inversion. The inversion from the at-the-tool acquisition can be used in the inversion of the signal from the ahead-of-the-tool signal acquisition. This process enhances determination of the formation properties ahead of the tool by accounting for the signal contributions from at the tool not cancelled by selectively activating the arrangement of transmitters and receivers.

The arrangement of transmitter antennas and receiver antennas can be structured along the longitudinal axis of the tool, which is essentially perpendicular to the cross section of the tool corresponding to the cross section of a collar in a drill string. The arrangement includes the transmitters and receivers spaced apart from each other such that one of the transmitters or receivers is located nearest the drill bit and a last of the transmitters or receivers in the arrangement is the farthest from the drill bit. The one transmitter or receiver nearest the drill bit can be located as close to the drill bit as possible. The closer to the drill bit that the arrangement begins, the formation properties farther away from the drill bit can be determined. The first antenna may be placed on a collar behind the drilling motor. Alternatively, the first antenna may be placed on the drilling motor rather than on a collar behind the drilling motor.

In various embodiments, the arrangement of transmitter antennas and receiver antennas can be structured with various separation distances. The separation distance between the different antennas in the arrangement may be 32 inches or less. The separation distance between the different antennas in the arrangement may be in the range of about 10 feet to about 20 feet. For example, with a separation distance of 20 feet, an antenna can be placed at the drill bit, one behind the drill motor, and antennas further behind the drill bit. The antennas (transmitters and receivers) can be structured as distributed sensors along the drill string. The use of 32 inches, 10 feet, and 20 feet as separation distances are examples. Other distances can be used for separation of antennas in the arrangement of transmitter antennas and receiver antennas that provide for capture of a signal from a first region relative to the tool such that signal contributions from a second region relative to the tool can be substantially canceled (are cancelable to a maximum extent) based on the placement of the transmitter antennas and receiver antennas with respect to each other.

In various embodiments, the tool can be operated such that activation of transmitter antennas and signal acquisition by receiver antennas is conducted in a quiet period. Such a quiet period can occur when the drill motor is not operating. This quiet period operation may allow for increased accuracy of the cancellation process in each of the modes of operation, due to absence of noise from the drill motor. However, the various measurements can be taken during drilling operations. Furthermore, drilling may be stopped to improve measurement accuracy. The tool can be operated dynamically with the drill motor running such that the tool is operated above the noise of the drill motor. The tool can be operated at 5 kilohertz. For drilling noise at about a kilohertz, tool operation at about 5 kilohertz is sufficiently above the noise. Operation of the tool is not limited to 5 kilohertz, but may be operated at other frequencies.

Electromagnetic look ahead-of-the-bit sensors measure the resistivity of the formations that are about to be crossed by the drill bit in a drilling operation. These measurements can be useful for guiding the drilling operation into desired targets or to identify potential danger zones that could cause drastic changes in pressure and, if not properly handled, could compromise the integrity of the borehole. Conventional electromagnetic sensors in ahead-of-the-bit resistivity tools measure a combination of direct fields from transmitting to receiving sensors and fields due to surrounding formation and anomalies ahead of the bit. These measurements are used with an inversion algorithm to decouple and/or solve for all parameters. Successful inversion of each parameter in such conventional tools is dependent on the other parameters and results can be highly sensitive to noise.

In various embodiments, an optimized sensor design can be realized that can decouple the direct and formation signal from the signal due to the anomalies ahead of the bit by using a combination of transmitter/receiver arrangements and collecting and processing a specified combination of received voltages. Due to the decoupled nature of the measurements, difficulty in an inversion stage is significantly reduced, leading to more stable results than with conventional tools. In addition, each inverted parameter can be less dependent on the other inverted parameters and less affected by noise. In comparison with conventional tools and methods, the various processes and tools, as discussed with respect to example embodiments herein, can provide effective decoupled ahead-of-tool (ahead-of-bit) and formation measurement, effective decoupled and accurate anisotropic measurements, easier and more stable inversion of relevant parameters, a greater depth of detection in see-ahead applications, prevention of dangerous situations such as blow-outs, and enhanced recovery of hydrocarbons.

In various embodiments, a tool can comprise one or more of ahead-of-tool/ahead-of-bit arrangements of transmitters and receivers, at-the-tool arrangements of transmitters and receivers, and anisotropic arrangements of transmitters and receivers for anisotropic measurements. Each sensor element (i.e., transmitters and receivers) in these arrangements can be realized as a coil element, a tilted coil element, a wire element, a toroidal element, a solenoid element, an electrode type element, a transducer, or other appropriate electromagnetic based sensor. The selected sensors may operate in the frequency range from about 1 Hz to about 10 GHz. Other frequency ranges may be used. The positions of transmitters and receivers in various tool arrangements can be interchanged without affecting the functionality of the tool. The terms ahead-of-tool and ahead-of-bit are used substantially interchangeably herein, the ahead-of-tool arrangements being suitable to determine formation characteristics ahead of a bit disposed in front (ahead) of the tool.

FIG. 2 shows an example embodiment of an ahead-of-bit (AoB) arrangement 205 of a tool. AoB arrangement 205 includes an arrangement of transmitters and receivers structured to capture a signal from anomalies ahead of the tool such that contributions from direct transmitter-to-receiver signals and formation signals around the tool are cancelable to a maximum extent. Ahead-of-bit arrangement 205 includes a first transmitter/receiver pair and a second transmitter/receiver pair. First transmitter/receiver pair is arranged as a transmitter antenna 212-1 tilted with respect to a longitudinal axis 207 of the tool and a receiver antenna 214-1 tilted with respect to longitudinal axis 207 of the tool such that transmitter antenna 212-1 and receiver antenna 214-1 are separated by a first distance, $d_1$. The second transmitter/receiver pair is arranged as a transmitter antenna 212-2 tilted with respect to longitudinal axis 207 of the tool and a receiver antenna 214-2 tilted with respect to longitudinal axis 207 of the tool such that transmitter antenna 212-2 and receiver antenna 214-2 are separated by a second distance, $d_2$. Second distance $d_2$ is equal to the first distance $d_1$, that is, $d_1=d_2$. Though the relationship of individual distances $d_1$ and $d_2$ to each other is set, the individual value $d_1$ and $d_2$ is not limited to a specific value.

As shown in FIG. 2, each antenna can be tilted with respect to longitudinal axis 207 to the same angle. For example, each antenna can be tilted by 45 degrees. The centers of each antenna may be along longitudinal axis 207. Distances $d_1$ and $d_2$ can be measured from the centers of the antennas in accordance with arrangement 205 in FIG. 2.

In AoB arrangement 205, two measurements can be made. One measurement includes transmitting a signal from first transmitter 212-1, $T_A$, and, in response, receiving a signal at first receiver 214-1, $R_A$. The other measurement includes transmitting a signal from second transmitter 212-2, $T_B$, and, in response, receiving a signal at second receiver 214-2, $R_B$. The distances from $T_A$ to $R_A$, $d_1$, and from $T_B$ to $R_B$, $d_2$, are chosen equal, $d_1=d_2$, to ensure the direct transmitter-to-receiver signal and formation signal can be cancelled to a maximum extent. The same sensor R can be chosen as both $R_A$ and $R_B$, shown in FIG. 2, leading to a more compact design. With the complex voltage at receiver 214-1, $R_A$, due to current at transmitter 212-1, $T_A$, denoted as $V_{TARA}$, and with the complex voltage at receiver $R_B$ due to the same current at the transmitter 212-2, $T_B$, denoted as $V_{TBRB}$, the ahead-of-bit signal can be written as $$V_{ahead\text{-}of\text{-}bit} = V_{TARA} - V_{TBRB} \quad (1)$$

The nomenclature, $O_{TkRj}$, used herein denotes that measureable signal O is the measureable signal O at receiver $R_j$ due to application of another signal at transmitter $T_k$, where k and j can vary to reflect different transmitters and receivers of the tool. For example, O can be realized as a complex voltage.

FIG. 3 shows an example embodiment of an at-the-tool (AtT) arrangement 305 of a tool. AtT arrangement 305 includes an arrangement of transmitters and receivers structured such that signal contributions from anomalies ahead of the tool are cancelable to a maximum extent. AtT arrangement 305 includes a first transmitter/receiver pair and a second transmitter/receiver pair. The first transmitter/receiver pair is arranged as a transmitter antenna 312-1 tilted with respect to a longitudinal axis 307 of the tool and a receiver antenna 314-1 tilted with respect to longitudinal axis 307 of the tool such that transmitter antenna 312-1 is separated from a reference cross-section 309 of the tool by a first distance, $d_1$, and receiver antenna 314-1 is separated from reference cross-section 309 of the tool by a second distance, $d_2$. The second transmitter/receiver pair is arranged as a transmitter antenna 312-2 tilted with respect to longitudinal axis 307 of the tool and a receiver antenna 314-4 tilted with respect to longitudinal axis 307 of the tool such that transmitter antenna 312-2 is separated from reference cross-section 309 of the tool by a third distance, $d_3$, and receiver antenna 314-2 is separated from reference cross-section 309 of the tool by a fourth distance, $d_4$. The sum of the first and second distances is equal to the sum of the third and fourth distances, i.e., $d_1+d_2=d_3+d_4$. Though the relationship of individual distances $d_1$, $d_2$, $d_3$, and $d_4$ to each other is set, the above sum is not limited to a specific value. Reference cross-section 309 of the tool can be realized as the first end of the tool located nearest the drill bit.

As shown in FIG. 3, each antenna can be tilted with respect to longitudinal axis 307 to the same angle. For example, each antenna can be tilted by 45 degrees. Distances $d_1$, $d_2$, $d_3$, and $d_4$ can be measured from the centers of the antennas to the drill bit. The centers may be along longitudinal axis 307. Distances $d_1$, $d_2$, $d_3$, and $d_4$ can be measured from the centers of the antennas to a reference cross-section of the tool that is perpendicular to longitudinal axis 307 in accordance with arrangement 305 shown in FIG. 3.

In AtT arrangement 305, two measurements can be made. One measurement includes transmitting a signal from first transmitter 312-1, $T_C$, and, in response, receiving a signal at first receiver 314-1, $R_D$. The other measurement includes transmitting a signal from second transmitter 312-2, $T_D$, and, in response, receiving a signal at second receiver 314-2, $R_C$. With the distances from transmitters and receivers as $d_1$, $d_2$, $d_3$ and $d_4$, as shown in FIG. 3, these distances in this example arrangement obey the relation, $d_1+d_2=d_3+d_4$, to ensure a signal from anomalies ahead of the bit is minimized. With the complex voltage at receiver $R_D$ due to current at transmitter $T_C$ denoted as $V_{TCRD}$, and with the complex voltage at receiver $R_C$ due to the same current at the receiver $T_D$ denoted as $V_{TDRC}$, the at-the-tool signal is written as $$V_{at\text{-}the\text{-}tool}=V_{TCRD}-V_{TDRC} \quad (2)$$

Figure 4:
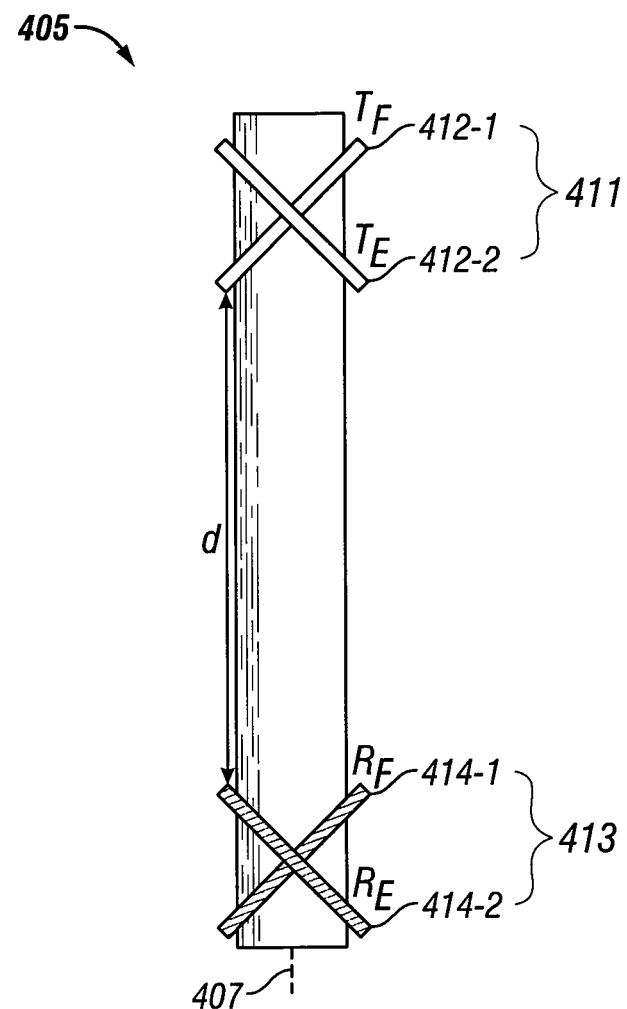
FIG. 4 shows an example embodiment of an arrangement of transmitters and receivers of a tool applicable for anisotropic measurements, according to various embodiments.

FIG. 4 shows an example embodiment of an arrangement 405 of transmitters and receivers of a tool applicable for anisotropic measurements. Arrangement 405 includes an arrangement of transmitters and receivers structured to capture a signal from around the tool such that a horizontal resistivity signal can be decoupled from a vertical resistivity signal to a maximum extent. Arrangement 405 of transmitters and receivers includes a pair 411 of transmitter antennas and a pair 413 of receiver antennas. Each transmitter antenna, 412-1 and 412-2, of pair 411 of transmitter antennas is tilted with respect to a longitudinal axis 407 of the tool such that center points of the transmitter antennas 412-1 and 412-2 are collocated. One transmitter antenna, e.g. 412-1, of the pair 411 of transmitter antennas has the same tilt elevation angle and the opposite tilt azimuth angle as the other transmitter antenna, e.g. 412-2, of pair 411. Each receiver antenna, 414-1 and 414-2, of pair 413 of receiver antennas is tilted with respect to longitudinal axis 407 of the tool such that center points of the receiver antennas 414-1 and 414-2 are collocated. One receiver antenna, e.g. 414-1, of pair 413 of receiver antennas has the same tilt elevation angle and the opposite tilt azimuth angle as the other receiver antenna, e.g. 414-2, of pair 413.

As shown in FIG. 4, each antenna of a cross coupled pair of antennas can be tilted with respect to longitudinal axis 407 to the same angle as a corresponding antenna of the other cross coupled pair. For example, corresponding antennas can be tilted by 45 degrees or by −45 degrees relative to longitudinal axis 407. The centers of the cross coupled pairs can be along longitudinal axis 407. Distances d can be measured from corresponding antennas on the pairs in accordance with arrangement 405 shown in FIG. 4. Distance d is not limited to specific values.

In arrangement 405 applicable for anisotropic measurements, a pair of tilted coil type antennas can be used for each of the transmitters and receivers, where one antenna in the pair has the same tilt elevation angle and the opposite tilt azimuth angle. As shown in FIG. 4, center points of antennas within each pair are collocated. With $T_E$ and $T_F$ denoting the transmitting pair and with $R_E$ and $R_F$ denoting the receiving pair, the horizontal and vertical resistivity signals can be obtained via the following equations:

$$V_{horizontal}=V_{TERE}+V_{TERF}+V_{TFRE}+V_{TFRF} \quad (3)$$

$$V_{vertical}=V_{TERE}V_{TERF}V_{TFRE}+V_{TFRF} \quad (4)$$

Figure 5:
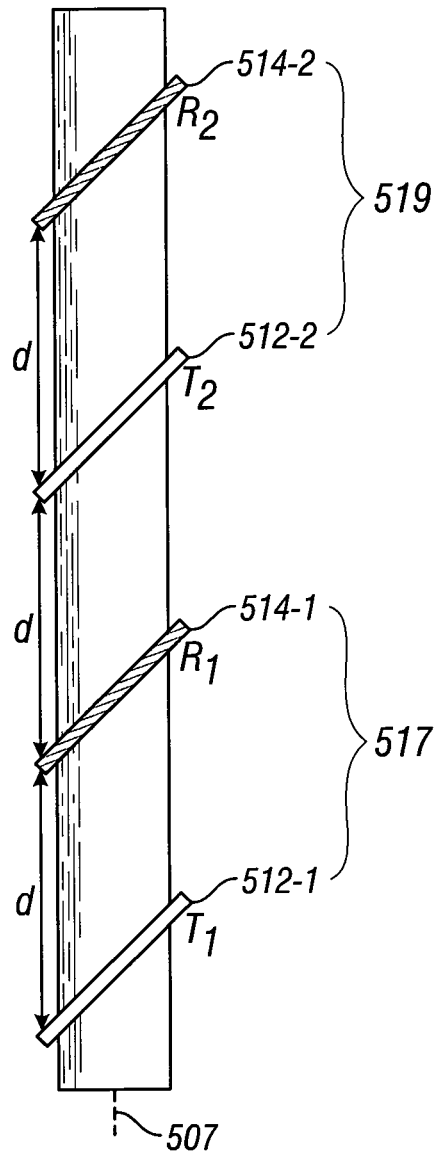
FIG. 5 shows an example embodiment of an arrangement of transmitters and receivers of a tool, according to various embodiments.
Figure 6:
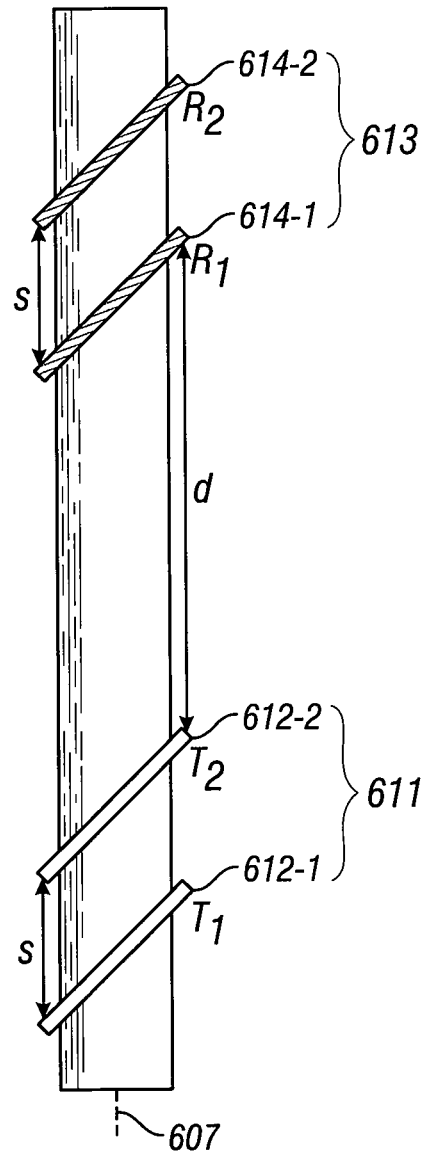
FIG. 6 shows an example embodiment of an arrangement of transmitters and receivers of a tool, according to various embodiments.
Figure 7:
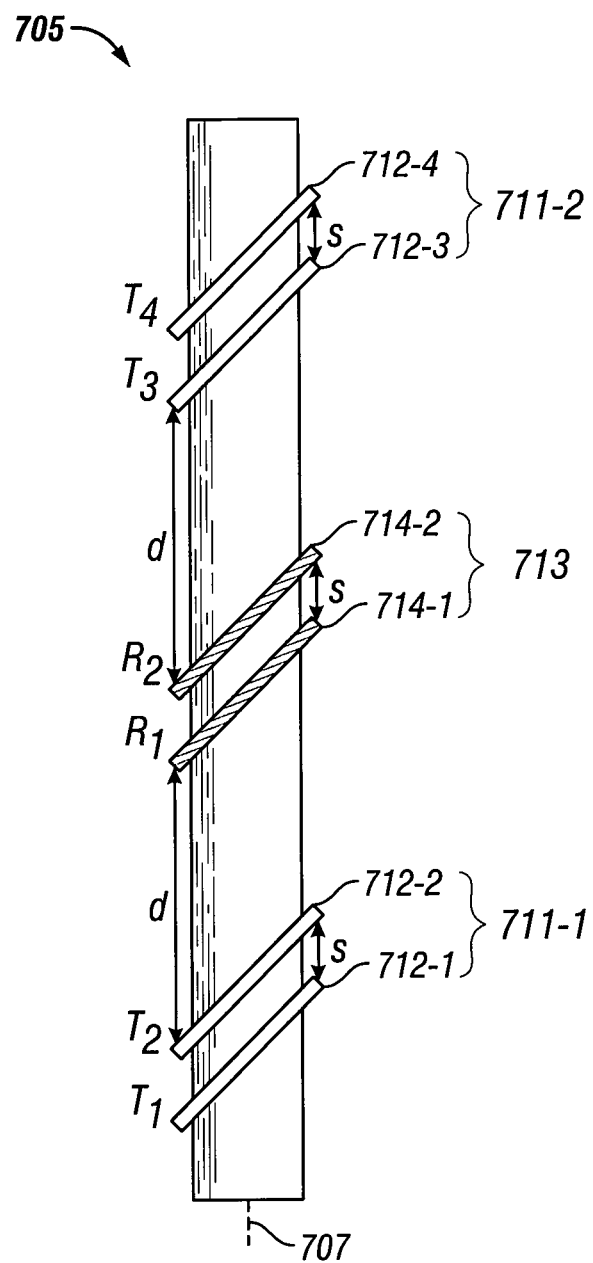
FIG. 7 shows an example embodiment of an arrangement of transmitters and receivers of a tool, in accordance with various embodiments.

FIGS. 5-7 show example embodiments of an arrangement of transmitters and receivers of a tool applicable for both AoB and AtT measurements. These arrangements include an arrangement of transmitters and receivers structured to capture a signal from anomalies ahead of the tool such that contributions from direct transmitter-to-receiver signals and formation signals around the tool are cancelable to a maximum extent and structured such that signal contributions from anomalies ahead of the tool are cancelable to a maximum extent.

FIG. 5 shows an example embodiment of an arrangement 505 of transmitters and receivers that includes a first transmitter/receiver pair 517 and a second transmitter/receiver pair 519. First transmitter/receiver pair 517 is arranged as a transmitter antenna 512-1 tilted with respect to a longitudinal axis 507 of the tool and a receiver antenna 514-1 tilted with respect to longitudinal axis 507 of the tool such that transmitter antenna 512-1 and receiver antenna 514-1 are separated by a separation distance d. Second transmitter/receiver pair 519 is arranged as a transmitter antenna 512-2 tilted with respect to longitudinal axis 507 of the tool and a receiver antenna 514-2 tilted with respect to longitudinal axis 507 of the tool such that transmitter antenna 512-2 and receiver antenna 514-2 are separated by the separation distance d. First transmitter/receiver pair 517 is separated from second transmitter/receiver pair 519 by the separation distance d. Distance d is not limited to a specific value.

As shown in FIG. 5, each antenna can be tilted with respect to longitudinal axis 507 to the same angle. For example, each antenna can be tilted by 45 degrees. The centers of the antennas may be along longitudinal axis 507. Distance d can be measured from corresponding locations on each of the antennas in accordance with arrangement 505 shown in FIG. 5.

With $V_{AoB}$ denoting the complex-valued ahead-of-bit signal and $V_{AtT}$ denoting the complex-valued at-the-tool signal, measurements made with arrangement 505 can be expressed as $$V_{AoB}=V_{T1R1}-V_{T2R1} \quad (5)$$

$$V_{AtT}=V_{T1R2}-V_{T2R1} \quad (6)$$

Equation (5) effectively provides a significantly isolated AoB signal. Equation (6) effectively provides a significantly isolated AtT signal.

FIG. 6 shows an example embodiment of an arrangement 605 of transmitters and receivers of a tool. Arrangement 605 includes a transmitter/transmitter pair 611 and a receiver/receiver pair 613. Transmitter/transmitter pair 611 is arranged as a first transmitter antenna 612-1 separated from a second transmitter antenna 612-2 by a first distance, s. Both transmitter antennas 612-1 and 612-2 are tilted with respect to a longitudinal axis 607 of the tool. Receiver/receiver pair 613 is arranged as a first receiver antenna 614-1 separated from a second receiver antenna 614-2 by the first distance, s. Both receiver antennas 614-1 and 614-2 are tilted with respect to longitudinal axis of the tool 607. Transmitter/transmitter pair 611 is separated from the receiver/receiver pair 613 by a second distance, d. Distances s and d are not limited to specific values.

As shown in FIG. 6, each antenna can be tilted with respect to longitudinal axis 607 to the same angle. For example, each antenna can be tilted by 45 degrees. The centers of the antennas may be along longitudinal axis 607. Distances s and d can be measured from corresponding locations on each of the antennas in accordance with arrangement 605 shown in FIG. 6.

Measurements made with arrangement 605 can be expressed as $$V_{AoB} = V_{T1R1} - V_{T2R2} \quad (7)$$

$$V_{AtT} = V_{T1R2} - V_{T2R1} \quad (8)$$

Equation (7) effectively provides a significantly isolated AoB signal. Equation (8) effectively provides a significantly isolated AtT signal.

FIG. 7 shows an example embodiment of an arrangement 705 of transmitters and receivers of a tool. Arrangement 705 includes a first transmitter/transmitter pair 711-1, a second transmitter/transmitter pair 711-1, and a receiver/receiver pair 713. First transmitter/transmitter pair 711-1 is arranged as a first transmitter antenna 712-1 separated from a second transmitter antenna 712-2 by a first distance, s. Both transmitter antennas 712-1 and 712-2 are tilted with respect to a longitudinal axis 707 of the tool. Second transmitter/transmitter pair 711-2 is arranged as a third transmitter antenna 712-3 separated from a fourth transmitter antenna 712-4 by the first distance, s. Both transmitter antennas 712-3 and 712-4 are tilted with respect to longitudinal axis 707 of the tool. Receiver/receiver pair 713 is arranged as a first receiver antenna 714-1 separated from a second receiver antenna 714-2 by the first distance, s. Both receiver antennas 714-1 and 714-2 are tilted with respect to longitudinal axis 707 of the tool. Receiver/receiver pair 713 is disposed between first transmitter/transmitter pair 711-1 and second transmitter/transmitter pair 711-1 such that the receiver/receiver pair 713 is separated from first transmitter/transmitter pair 711-1 and from second transmitter/transmitter pair 711-2 by a second distance, d. Distances s and d are not limited to specific values.

As shown in FIG. 7, each antenna can be tilted with respect to longitudinal axis 707 to the same angle. For example, each antenna can be tilted by 45 degrees. The centers of the antennas may be along longitudinal axis 707. Distances s and d can be measured from corresponding locations on each of the antennas in accordance with arrangement 705 shown in FIG. 7.

Measurements made with arrangement 705 can be expressed as $$V_{AoB1} = V_{T1R1} - V_{T3R1} \quad (9)$$

$$V_{AoB2} = V_{T2R2} - V_{T4R2} \quad (10)$$

$$V_{AtT1} = V_{T1R2} - V_{T2R1} \quad (11)$$

$$V_{AtT2} = V_{T4R1} - V_{T3R2} \quad (12)$$

Equations (9) and 10 effectively provide a significantly isolated AoB signal. Equations (11) and (12) effectively provide a significantly isolated AtT signal.

Arrangements 505, 605, and 705 of FIGS. 5, 6, and 7, respectively, or similar arrangements such as with positions of transmitter sensors and receiver sensors interchanged, that feature both ahead-of-bit and at-the-tool measurements can produce a compact tool. Arrangement 705 can be utilized to make two sets of measurements when compared to arrangement 605 and arrangement 505, at the expense of two additional sensors.

Figure 8:
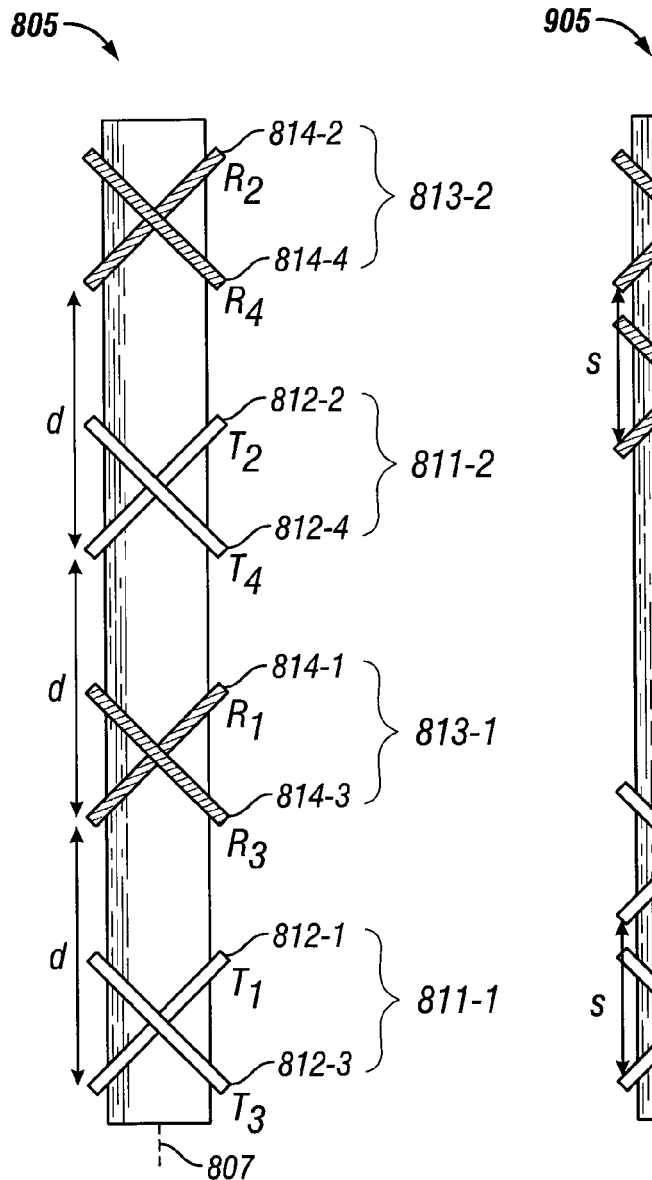
FIG. 8 shows an example embodiment of an arrangement of transmitters and receivers of a tool applicable for anisotropic measurements, in accordance with various embodiments.
Figure 9:
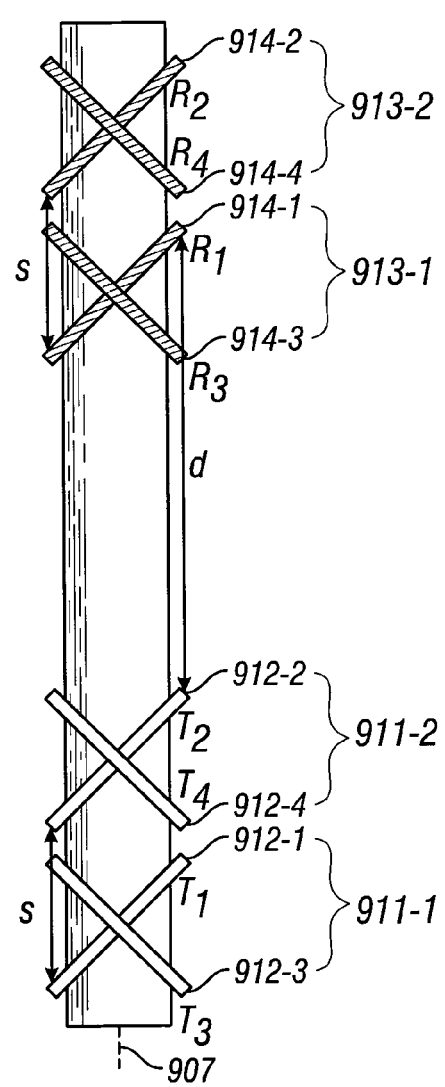
FIG. 9 shows an example of an embodiment of an arrangement of transmitters and receivers of a tool applicable for anisotropic measurements, in accordance with various embodiments.

FIGS. 8 and 9 show example embodiments of arrangements of transmitters and receivers of tools applicable for AoB and AtT anisotropic measurements. FIG. 8 shows an example embodiment of an arrangement 805 of transmitters and receivers that includes a first pair 811-1 of transmitter antennas, a second pair 811-2 of transmitter antennas, a first pair 813-1 of receiver antennas, and a second pair 813-2 of receiver antennas. Each transmitter antenna 812-1 and 812-3 of first pair 811-1 of transmitter antennas is tilted with respect to a longitudinal axis 807 of the tool such that center points of the transmitter antennas 812-1 and 812-3 of first pair 811-1 of transmitter antennas are collocated. One transmitter antenna, for example 812-1, of first pair 811-1 of transmitter antennas has the same tilt elevation angle and opposite tilt azimuth angle as the other transmitter antenna, for example 812-3, of first pair 811-1 of transmitter antennas. Each transmitter antenna 812-2 and 812-4 of second pair 811-2 of transmitter antennas is tilted with respect to longitudinal axis 807 of the tool such that center points of the transmitter antennas 812-2 and 812-4 of the second pair of transmitter antennas are collocated. One transmitter antenna, for example 812-2, of second pair 811-2 of transmitter antennas has the same tilt elevation angle and opposite tilt azimuth angle as the other transmitter antenna, for example 812-4, of second pair 811-2 of transmitter antennas.

Each receiver antenna 814-1 and 814-3 in first pair 813-1 of receiver antennas is tilted with respect to longitudinal axis 807 of the tool such that center points of the receiver antennas 814-1 and 814-3 of first pair 813-1 are collocated. One receiver antenna, for example 814-1 of first pair 813-1 of receiver antennas has the same tilt elevation angle and the opposite tilt azimuth angle as the other receiver antenna, for example 814-3, of first pair 813-1 of receiver antennas. Each receiver antenna 814-2 and 814-4 in second pair 813-2 of receiver antennas is tilted with respect to longitudinal axis 807 of the tool such that center points of the receiver antennas 814-2 and 814-4 of second pair 813-2 are collocated. One receiver antenna, for example 814-2, of second pair 813-2 of receiver antennas has the same tilt elevation angle and the opposite tilt azimuth angle as the other receiver antenna, for example 814-4, of the second pair 813-2 of receiver antennas. First pair 813-1 of receiver antennas is separated from first pair 811-1 of transmitter antennas by a separation distance, d. Second pair 811-2 of transmitter antennas is separated from first pair 813-1 of receiver antennas by the separation distance, d. Second pair 813-2 of receiver antennas is separated from second pair 811-2 of transmitter antennas by the separation distance, d. Distance d is not limited to specific values. First pair 813-1 of receiver antennas is disposed between first pair 811-1 of transmitter antennas and second pair 811-2 of transmitter antennas.

As shown in FIG. 8, each antenna of a cross coupled pair of antennas can be tilted with respect to longitudinal axis 807 to the same angle as a corresponding antenna of the other cross coupled pairs. For example, corresponding antennas can be tilted by 45 degrees or by −45 degrees relative to longitudinal axis 807. The centers of the cross coupled pairs can be along longitudinal axis 807 in accordance with arrangement 805. Distances d can be measured from corresponding antennas on the pairs in accordance with arrangement 805 shown in FIG. 8.

Arrangement 805 provides a structure that features ahead-of-bit, at-the-tool, and anisotropic measurements. In such an arrangement, a vertical and a horizontal measurement are available so that formation anisotropy information can be effectively obtained. Measurements associated with arrangement 805 can be expressed as follows $$V_{AoBh} = V_{T1R1} + V_{T1R3} + V_{T3R1} + V_{T3R3} - V_{T2R2} - V_{T2R4} - V_{T4R2} - V_{T4R4} \quad (13)$$

$$V_{AoBv} = V_{T1R1} - V_{T1R3} - V_{T3R1} + V_{T3R3} - V_{T2R2} + V_{T2R4} + V_{T4R2} - V_{T4R4} \quad (14)$$

$$V_{AtTh} = V_{T1R2} + V_{T1R4} + V_{T3R2} + V_{T3R4} - V_{T2R1} - V_{T2R3} - V_{T4R1} - V_{T4R3} \quad (15)$$

$$V_{AtTv} = V_{T1R2} - V_{T1R4} - V_{T3R2} + V_{T3R4} - V_{T2R1} + V_{T2R3} + V_{T4R1} - V_{T4R3} \quad (16)$$

where the h in the subscript refers to horizontal related signals and the v in the subscript refers to vertical related signals. Equation (13) effectively provides a significantly isolated horizontal resistivity $R_h$ bed signal. Equation (14) effectively provides a significantly vertical resistivity isolated $R_v$ bed signal. Equation (15) provides a significantly isolated horizontal resistivity $R_h$ direct signal. Equation (16) provides a significantly isolated vertical resistivity $R_v$ direct signal.

FIG. 9 shows an example embodiment of an arrangement 905 of transmitters and receivers of a tool. Arrangement 905 includes a first pair 911-1 of transmitter antennas, a second pair 911-2 of transmitter antennas, a first pair 913-1 of receiver antennas, and a second pair 913-2 of receiver antennas. Each transmitter antenna 912-1 and 912-3 of first pair 911-1 of transmitter antennas is tilted with respect to a longitudinal axis 907 of the tool such that center points of transmitter antennas 912-1 and 912-3 of first pair 911-1 of transmitter antennas are collocated. One transmitter antenna, for example 912-1, of first pair 911-1 of transmitter antennas has the same tilt elevation angle and the opposite tilt azimuth angle as the other transmitter antenna, for example 912-3, of first pair 911-1 of transmitter antennas. Each transmitter antenna 912-2 and 912-4 of second pair 911-2 of transmitter antennas is tilted with respect to longitudinal axis 907 of the tool such that center points of the transmitter antennas 912-2 and 912-4 of second pair 913-2 of transmitter antennas are collocated. One transmitter antenna, for example 912-2, of second pair 911-2 of transmitter antennas has the same tilt elevation angle and the opposite tilt azimuth angle as the other transmitter antenna, for example 912-4, of second pair 911-2 of transmitter antennas. Second pair 911-2 of transmitter antennas is separated from first pair 911-1 of transmitter antennas by a first distance, s.

Each receiver antenna 914-1 and 914-3 of first pair 913-1 of receiver antennas is tilted with respect to longitudinal axis 907 of the tool such that center points of the receiver antennas 914-1 and 914-3 of first pair 913-1 of receiver antennas are collocated. One receiver antenna, for example 914-1, of first pair 913-1 of receiver antennas has the same tilt elevation angle and the opposite tilt azimuth angle as the other receiver antenna, for example 914-3, of first pair 913-1 of receiver antennas. Each receiver antenna 914-2 and 914-4 of second pair 913-2 of receiver antennas is tilted with respect to longitudinal axis 907 of the tool such that center points of the receiver antennas 914-2 and 914-4 of second pair 913-2 of receiver antennas are collocated. One receiver antenna, for example 914-2, of second pair 913-2 of receiver antennas has the same tilt elevation angle and the opposite tilt azimuth angle as the other receiver antenna, for example 913-4, of second pair 913-2 of receiver antennas. Second pair 913-2 of receiver antennas is separated from first pair 913-1 of receiver antennas by the first distance, s. First pair 913-1 and second pair 913-2 of receiver antennas are separated from first pair 911-1 and second pair 911-2 of transmitter antennas such that neither of pairs 913-1 and 913-2 of receiver antennas are placed between pairs 911-1 and 911-2 of transmitter antennas.

As shown in FIG. 9, each antenna of a cross coupled pair of antennas can be tilted with respect to longitudinal axis 907 to the same angle as a corresponding antenna of the other cross coupled pairs. For example, corresponding antennas can be tilted by 45 degrees or by −45 degrees relative to longitudinal axis 907. The centers of the cross coupled pairs can be along longitudinal axis 907 in accordance with arrangement 905 shown in FIG. 9. Distances s and d can be measured from corresponding antennas on the pairs in accordance with arrangement 905. Distances s and d are not limited to specific values.

Arrangement 905 provides a structure that features ahead-of-bit, at-the-tool, and anisotropic measurements. In such an arrangement, a vertical and a horizontal measurement are available so that formation anisotropy information can be effectively obtained. Measurements associated with arrangement 905 can be expressed as follows $$V_{AoBh} = V_{T1R1} + V_{T1R3} + V_{T3R1} + V_{T3R3} - V_{T2R1} - V_{T2R3} - V_{T4R1} - V_{T4R3} \quad (17)$$

$$V_{AoBv} = V_{T1R1} - V_{T1R3} - V_{T3R1} + V_{T3R3} - V_{T2R1} + V_{T2R3} + V_{T4R1} - V_{T4R3} \quad (18)$$

$$V_{AtTh} = V_{T1R2} + V_{T1R4} + V_{T3R2} + V_{T3R4} - V_{T2R1} - V_{T2R3} - V_{T4R1} - V_{T4R3} \quad (19)$$

$$V_{AtTv} = V_{T1R2} - V_{T1R4} - V_{T3R2} + V_{T3R4} - V_{T2R1} + V_{T2R3} + V_{T4R1} - V_{T4R3} \quad (20)$$

Equation (17) effectively provides a significantly isolated $R_h$ bed signal. Equation (18) effectively provides a significantly isolated $R_v$ bed signal. Equation (19) provides a significantly isolated $R_h$ direct signal. Equation (20) provides a significantly isolated $R_v$ direct signal.

Figure 10A:
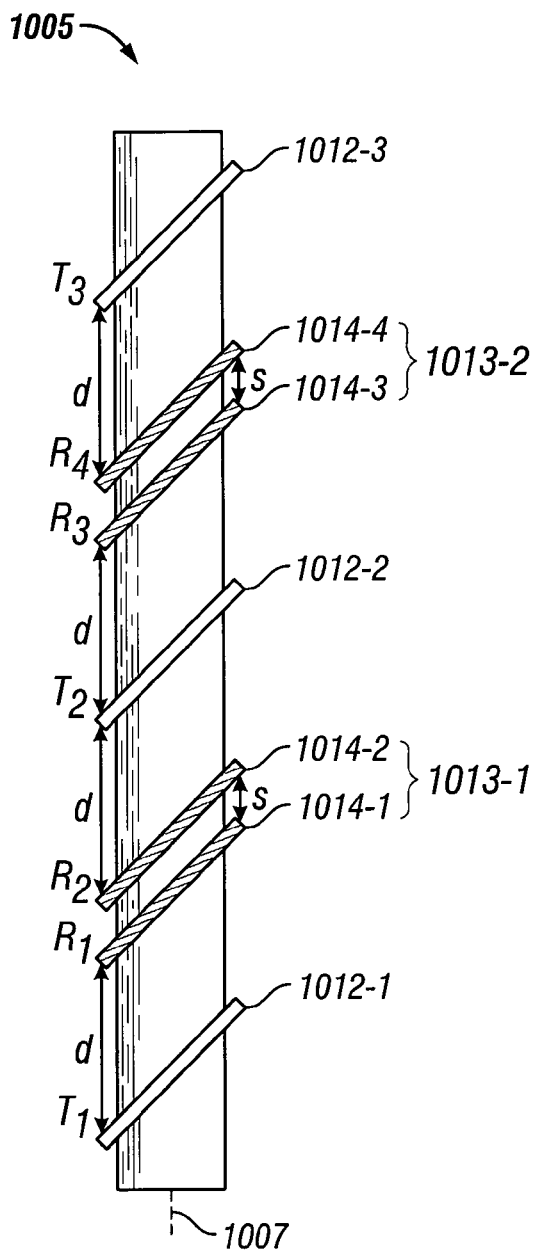
FIGS. 10A-B show example embodiments of arrangements of transmitters and receivers of a tool applicable for compensated AoB measurement, in accordance with various embodiments.
Figure 10B:
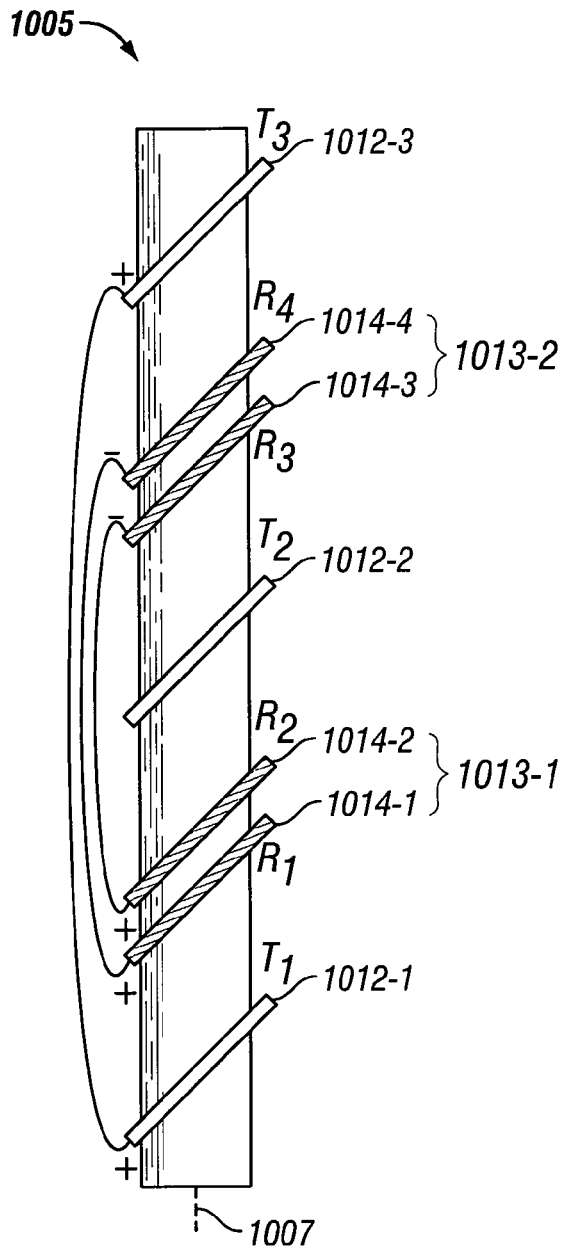

FIGS. 10A-B show example embodiments of an arrangement of transmitters and receivers of a tool applicable for compensated AoB measurement.

FIG. 10A shows an example arrangement 1005 of transmitters and receivers that includes a first transmitter antenna 1012-1, a second transmitter antenna 1012-2, a third transmitter antenna 1012-3, a first pair 1013-1 of receiver antennas, and a second pair 1013-2 of receiver antennas. Each of first transmitter antenna 1012-1, second transmitter antenna 1012-2, and third transmitter antenna 1012-3 are tilted with respect to a longitudinal axis 1007 of the tool.

Each receiver antenna 1014-1 and 1014-2 of first pair 1013-1 of receiver antennas is tilted with respect to longitudinal axis 1007 of the tool. Receiver antennas 1014-1 and 1014-2 of first pair 1013-1 of receiver antennas are separated from each other by a first distance, s. First pair 1013-1 of receiver antennas is disposed between first transmitter antenna 1012-1 and second transmitter antenna 1012-2 and separated from both first transmitter antenna 1012-1 and second transmitter antenna 1012-2 by a second distance, d.

Each receiver antenna 1014-3 and 1014-4 of second pair 1013-2 of receiver antennas is tilted with respect to longitudinal axis 1007 of the tool. Receiver antennas 1014-3 and 1014-4 of second pair 1013-2 of receiver antennas are separated from each other by the first distance, s. Second pair 1013-2 of receiver antennas is disposed between second transmitter antenna 1012-2 and third transmitter antenna 1012-3 and separated from both second transmitter antenna 1012-2 and third transmitter antenna 1012-3 by second distance, d.

As shown in FIG. 10A, each antenna can be tilted with respect to longitudinal axis 1007 to the same angle. For example, each antenna can be tilted by 45 degrees. The centers of the antennas may be along longitudinal axis 1007. Distances s and d can be measured from corresponding locations on each of the antennas in accordance with arrangement 1005 shown in FIG. 10. Distances s and d are not limited to specific values.

Arrangement 1005 provides a structure to make a compensated AoB measurement. A compensated AoB measurement is directed at relative strengths of signals to provide a significantly isolated AoB signal. The measurements can be taken to generate a ratio that provides a compensation ratio for the AoB signal. Generating an AoB compensation ratio provides measurements that do not require amplitude and phase calibration in the sensors (transmitters and receivers) of arrangement 1005. AoB compensation ratio, $C_{AoB}$, can be generated as $$C_{AoB} = \frac{(V_{T1R1} - V_{T1R4} - V_{T3R4} + V_{T3R1})(V_{T2R2} - V_{T2R3})}{(V_{T1R2} - V_{T1R3} - V_{T3R3} + V_{T3R2})(V_{T2R1} - V_{T2R4})} \quad (21)$$

FIG. 10B shows an example embodiment in arrangement 1005 in which subtraction and addition operations in $C_{AoB}$ calculations can be performed electrically. These electrical operations reduce noise and allow larger dynamic range in measurements. Lines denote electrical connections where plus is a straight connection and a minus is a connection with inverted polarity with respect to the plus connection. That is, a + connection is 180 degree out of phase with a − connection in transmitted (in the case of transmitters) signals and in received (in the case of receivers) signals.

FIGS. 11A-B show example embodiments of an arrangement of transmitters and receivers of a tool applicable for compensated AtT measurement.

FIG. 11A shows an example arrangement 1105 of transmitters and receivers that includes a first receiver antenna 1114-1, a second receiver antenna 1114-2, a third receiver antenna 1114-3, a first pair 1111-1 of transmitter antennas, and a second pair 1111-2 of transmitter antennas. First receiver antenna 1114-1, second receiver antenna 1114-2, and third receiver antenna 1114-3 can be configured as a group 1113 of receiver antennas. First receiver antenna 1114-1 is tilted with respect to a longitudinal axis 1107 of the tool. Second receiver antenna 1114-2 is tilted with respect to longitudinal axis 1107 of the tool, and second receiver antenna 1114-2 is separated from first receiver antenna 1114-1 by a first distance, s. Third receiver antenna 1114-3 is tilted with respect to longitudinal axis 1107 of the tool, and third receiver antenna 1114-3 is separated from second receiver antenna 1114-2 by the first distance, s. Group 113 is separated from first transmitter pair 1111-1 by a second distance, d.

Each transmitter antenna 1112-1 and 1112-2 of first pair of transmitter antennas 1111-1 is tilted with respect to longitudinal axis 1107 of the tool. Transmitter antennas 1112-1 and 1112-2 of first pair 1111-1 of transmitter antennas are separated from each other by the first distance, s. Each transmitter antenna 1112-3 and 1112-4 of second pair 1111-2 of transmitter antennas is tilted with respect to longitudinal axis 1107 of the tool. Transmitter antennas 1112-3 and 1112-4 of second pair 1111-2 of transmitter antennas is separated from each other by the first distance, s. Group 113 is separated from second transmitter pair 1111-2 by second distance, d. Second pair 1111-2 of transmitter antennas is separated from first pair 1111-1 of transmitter antennas by the first, second, and third receiver antennas.

As shown in FIG. 11A, each antenna can be tilted with respect to longitudinal axis 1107 to the same angle. For example, each antenna can be tilted by 45 degrees. The centers of the antennas may be along longitudinal axis 1107. Distances s and d can be measured from corresponding locations on each of the antennas in accordance with arrangement 1105 as shown in FIG. 11. Distances s and d are not limited to specific values.

Arrangement 1105 provides a structure to make a compensated AtT measurement. A compensated AtT measurement is directed at relative strengths of signals to provide a significantly isolated AtT signal. The measurements can be taken to generate a ratio that provides a compensation ratio for the AtT signal. Generating an AtT compensation ratio provides measurements that do not require amplitude and phase calibration in the sensors (transmitters and receivers) of arrangement 1105. AtT compensation ratio, $C_{AtT}$, can be generated as $$C_{AtT} = \frac{(V_{T2R1} - V_{T1R2})(V_{T3R3} - V_{T4R2})}{(V_{T2R2} - V_{T1R3})(V_{T3R2} - V_{T4R1})} \quad (22)$$

FIG. 11B shows an example embodiment in arrangement 1005 in which subtraction and addition operations in $C_{AtT}$ calculations can be performed electrically. These electrical operations reduce noise and allow larger dynamic range in measurements. Lines denote electrical connections where plus is a straight connection and a minus is a connection with inverted polarity with respect to the plus connection. That is, a + connection is 180 degree out of phase with a − connection in transmitted (in the case of transmitters) signals and in received (in the case of receivers) signals.

Tools similar to or identical to those discussed with respect to FIGS. 1-11B can be used to obtain measurements to determine formation properties ahead of the tool in which acquired signals can be optimized with respect to regions ahead of the tool and at the tool such that contributions from one region relative to the other region can be canceled, at least to a maximum extent based on placement of sensors relative to each other and sensor orientation. With the tool affixed relative to a drill bit of a drilling operation, ahead of the tool is the region ahead of the drill bit. The cancellation can be realized through subtraction and addition operation on the signals acquired in the measurement. Since the acquired signals are based on propagation through material formations, the measured values of these signals are in part a function of the material formation. Inversion processes provide a mechanism to relate the measured signals to the properties of the material that affects the signal ultimately received at the sensors of the tool.

Subtraction and addition operations that are applied on the signals can be performed as a post-processing step after obtaining all voltages individually. This post processing can be conducted according to the relevant expressions shown in equations 1-22 corresponding to the particular tool arrangement used. Subtraction and addition operations can also be performed by electrically connecting the sensors and adjusting the direction of current flow accordingly. For an example, in arrangement 505 of FIG. 5 and in arrangement 805 of FIG. 8, subtraction operation $V_{T1R1} - V_{T2R1}$, used in the equations corresponding to these arrangements, can be realized by applying the same amount of current in opposite directions on T1 and T2 simultaneously and measuring the voltage at R1 at once. This electrical approach eliminates some of the synchronization problems that may accompany separated measurements. In addition, this simultaneous activation and measurement process can reduce noise due to mismatch in operation of T1 and T2. Such an electrical process may be crucial in sensing ahead-of-the-bit anomalies, where noise level is the deciding factor on depth of detection. This electrical process may also provide enhanced performance in low frequency operation, where the direct signal (transmitter to receiver) is expected to be much larger when compared to the signal from target anomalies ahead of the drill bit.

Figure 12:
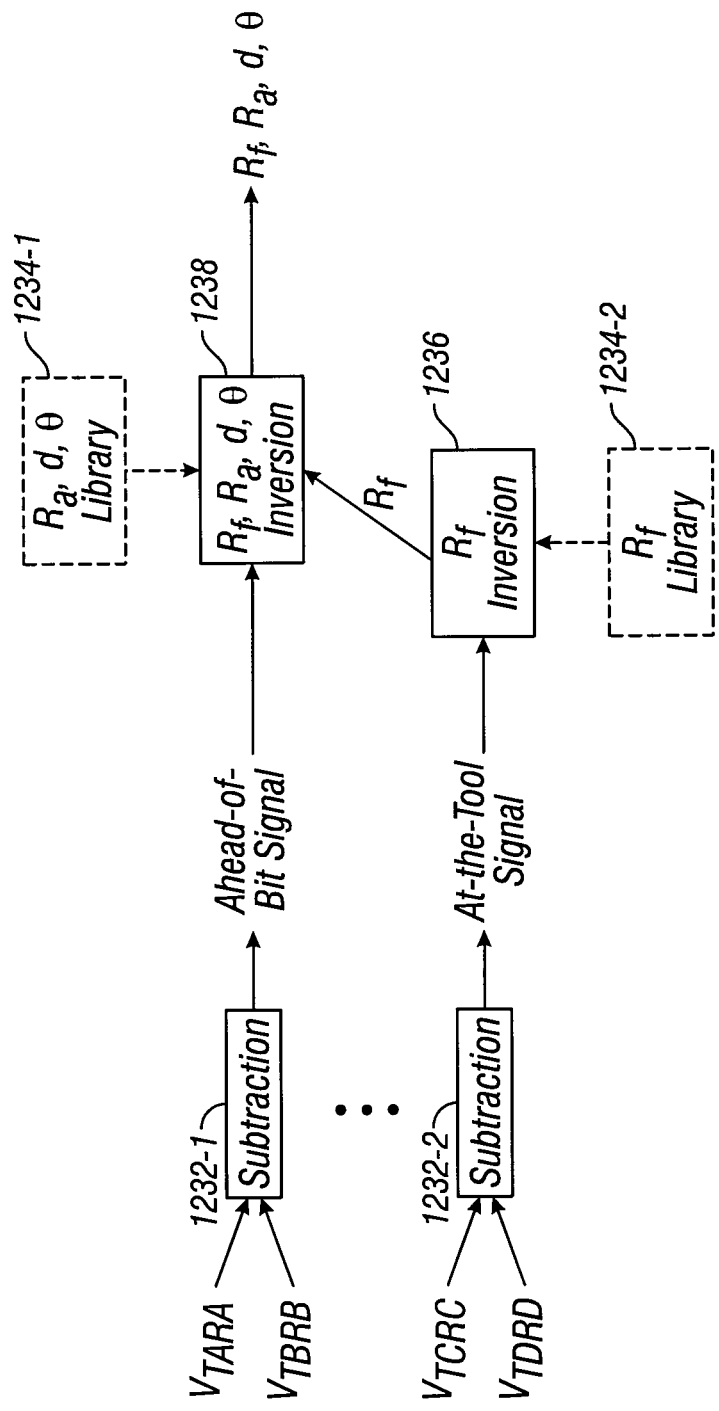
FIG. 12 shows an embodiment of an example process flow for inversion in which an arrangement of sensors is used for isotropic measurements, in accordance with various embodiments.

FIG. 12 shows an embodiment of an example process flow for inversion in which an arrangement of sensors is used for isotropic measurements. At 1232-1 and 1232-2, the ahead-of-bit signal and the at-the-tool signal are extracted by subtracting the appropriate voltages associated with the tool implemented. An at-the-tool signal, having a complex value, mostly consists of a combination of direct and formation signals. In many instances, most of the imaginary part is comprised of the direct signal, while most of the real part is comprised of the formation signal. As a result, the real part of the at-the-tool signal can be effectively used to produce the formation resistivity directly, or through an iterative inversion procedure where it is used as an initial value. If a forward model is available to simulate a formation signal, an anomaly signal inversion can be performed via iterative optimization. Signals can be typically parameterized by depth, d, and elevation angle, θ. Alternatively, a library of pre-compiled responses can also be used in inversion.

Library 1234-1 can be used with an ahead-of-bit signal, where library 1234-1 includes data on resistivities of anomalies $R_a$, depth d, and elevation angle θ, relative to various responses. Library 1234-2 can be used with an at-the-tool signal, where library 1234-2 includes data on formation resistivities, relative to various responses. Since the at-the-tool signal is mostly decoupled from anomaly effects from ahead of the bit, and the ahead-of-bit signal is decoupled from resistivity effects around the tool, both signals are expected to yield more accurate inversion results that are less affected by each-other and also less affected by noise. Due to effective cancellation of the direct signal in the ahead-of-bit signal, a higher depth of detection is expected in the see-ahead determination. Data from library 1234-2 can be applied to the at-the-tool signal to perform inversion 1236 generating the formation resistivity, $R_f$, for the drilling operation in progress. The currently determined formation resistivity $R_f$ can be applied to the ahead-of-bit signal along with data from library 1234-1 to perform inversion 1238 generating the anomaly resistivity $R_a$, depth d, and elevation angle θ along with the formation resistivity $R_f$ for the drilling operation in progress.

In various embodiments, an inversion process may be conducted on compensated coefficients as given in equations 21 and 22. Library 1234-2 may contain data such that $C_{AtT}$ can be operated on in an inversion process to provide the formation resistivity $R_f$ for the drilling operation in progress. Library 1234-1 may contain data such that $C_{AoB}$ can be operated on in an inversion process using $R_f$ from the inversion operation on $C_{AtT}$ to provide the anomaly resistivity $R_a$, depth d, and elevation angle θ along with the formation resistivity $R_f$ for the drilling operation in progress.

The analysis results can be stored in machine-readable storage medium integrated with the tool or located along the drill string and coupled to the tool. The analysis results can be transmitted to the surface via a communication interface and communication mechanism established in the drilling operation, for example, via a telemetry system. Alternatively, the data can be transmitted to the surface for analysis. The machine-readable storage medium can include libraries 1234-1 and 1234-2 as separate entities or integrated entities. The machine-readable storage medium can include libraries for anisotropic data along with libraries 1334-1 and 1334-3 as separate entities or integrated entities. Such machine-readable storage medium can be realized as a distributed memory system. Upon observing the changes in the resistivity, drastic changes in the pressure ahead of the bit can be detected and appropriate action can be taken to prevent blow-outs. These changes can be monitored such that automatic alerts may be generated. The results from the various embodiments for a methodology to detect the environment ahead of a drill bit can also be applied to intercept or avoid other wells or well branches. The results may be used to steer the drilling operation.

Figure 13:
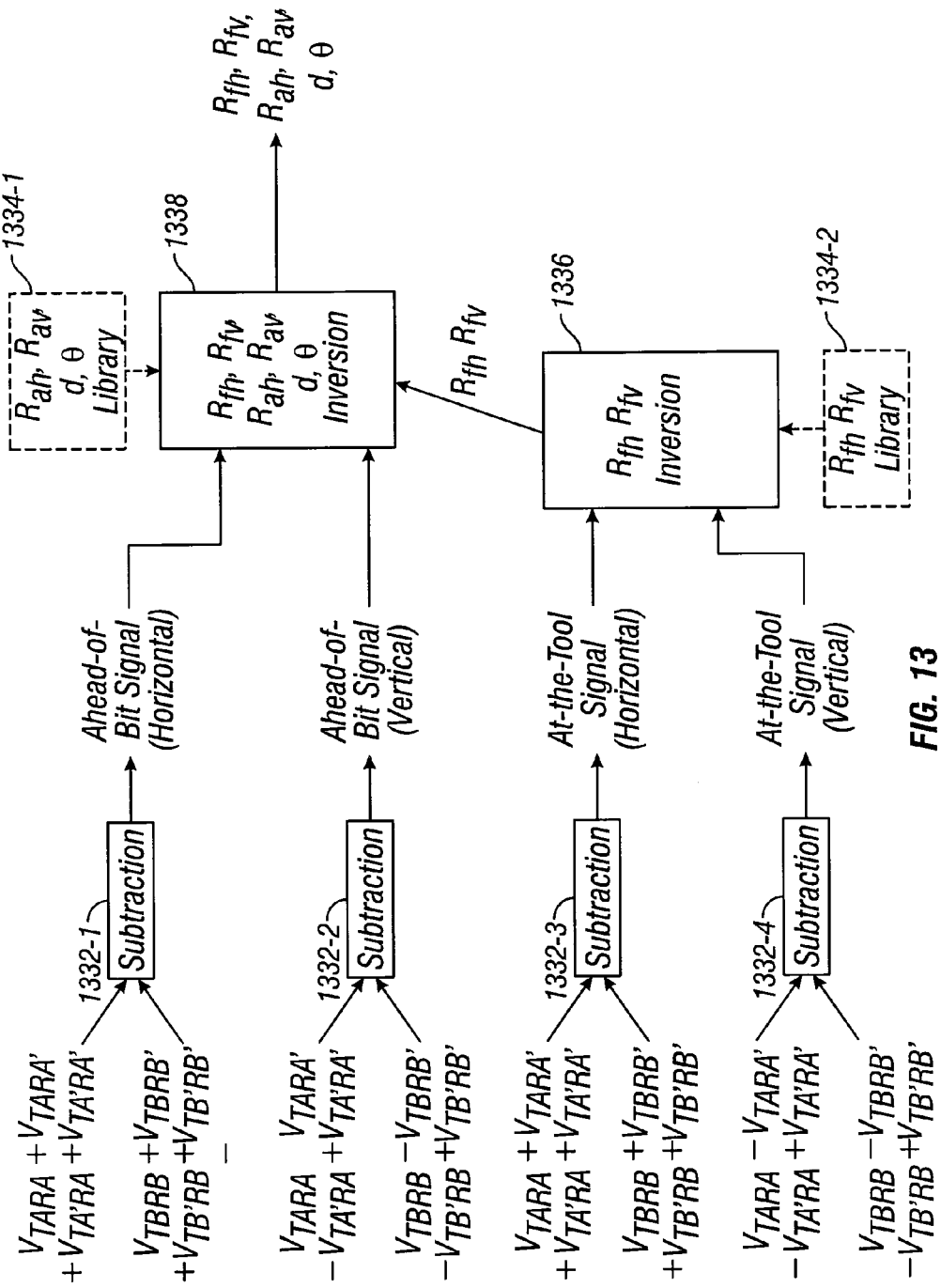
FIG. 13 shows an embodiment of an example process flow for inversion in which an arrangement of sensors is used for anisotropic measurements, according to various embodiments.

FIG. 13 shows an embodiment of an example process flow for inversion in which an arrangement of sensors is used for anisotropic measurements. Here, as can be seen from equations 13-20, $T_A'$ is used to denote the transmitter sensor associated with transmitter sensor $T_A$ in a pair and the use of ' is made similarly for other sensors. For example, in equation (13), A and A' are 1 and 3, respectively, and B and B' are 2 and 4, respectively. For the anisotropic situation, horizontal and vertical signals are obtained for both ahead-of-bit and at-the-tool measurements. In order to obtain the horizontal tool measurement, the voltage combinations described in equations (13), (15), (17), and (19) can be used. In order to obtain the vertical tool measurement, the voltage combinations described in equations (14), (16), (18), and (20) can be used. Anisotropic at-the-tool measurements can be effectively used to obtain formation horizontal and vertical resistivity, while the anisotropic ahead-of-bit measurement can be effectively used to obtain elevation angle and distance to a target anomaly. The inversion can be carried out similar to the isotropic case.

At 1332-1, 1332-2, 1332-3, and 1332-4, the horizontal ahead-of-bit signal, the vertical ahead-of-bit signal, the horizontal at-the-tool signal, and the vertical at-the-tool signal are extracted, respectively, by subtracting the appropriate voltages associated with the tool implemented. Library 1334-1 can be used with the horizontal and vertical ahead-of-bit signals, where library 1334-1 includes data on horizontal resistivities $R_{ah}$ and vertical resistivities $R_{av}$ of anomalies, depth d, and elevation angle θ, relative to various responses. Library 1334-2 can be used with an at-the-tool signal, where library 1234-2 includes data on formation horizontal resistivities $R_{fh}$ and formation vertical resistivities $R_{fv}$, relative to various responses. Data from library 1334-2 can be applied to the horizontal and vertical at-the-tool signals to perform inversion 1336 generating the horizontal resistivity $R_{fh}$ and formation vertical resistivity $R_{fv}$ for the drilling operation in progress. The currently determined horizontal resistivity $R_{fh}$ and formation vertical resistivity $R_{fv}$ can be applied to the horizontal and vertical ahead-of-bit signals along with data from library 1334-1 to perform inversion 1338 generating the horizontal resistivity $R_{ah}$ and vertical resistivity $R_{av}$ of an anomalies, depth d, and elevation angle θ along with the horizontal resistivity $R_{fh}$ and formation vertical resistivity $R_{fv}$ for the drilling operation in progress.

The analysis results of the anisotropic measurements can be stored in machine-readable storage medium integrated with the tool or located along the drill string and coupled to the tool. The analysis results can be transmitted to the surface via a communication interface and communication mechanism established in the drilling operation, for example, via a telemetry system. Alternatively, the data can be transmitted to the surface for analysis. The machine-readable storage medium can include libraries 1334-1 and 1334-2 as separate entities or integrated entities. The machine-readable storage medium can include libraries 1234-1, 1234-2, 1334-1, and 1334-2 as separate entities or integrated entities. Such machine-readable storage medium can be realized as a distributed memory system. Upon observing the changes in the resistivity, drastic changes in the pressure ahead of the bit can be detected and appropriate action can be taken to prevent blow-outs. These changes can be monitored such that automatic alerts may be generated. The results from the various embodiments for a methodology to detect the environment ahead of a drill bit can also be applied to intercept or avoid other wells or well branches. The results may be used to steer the drilling operation.

Figure 14:
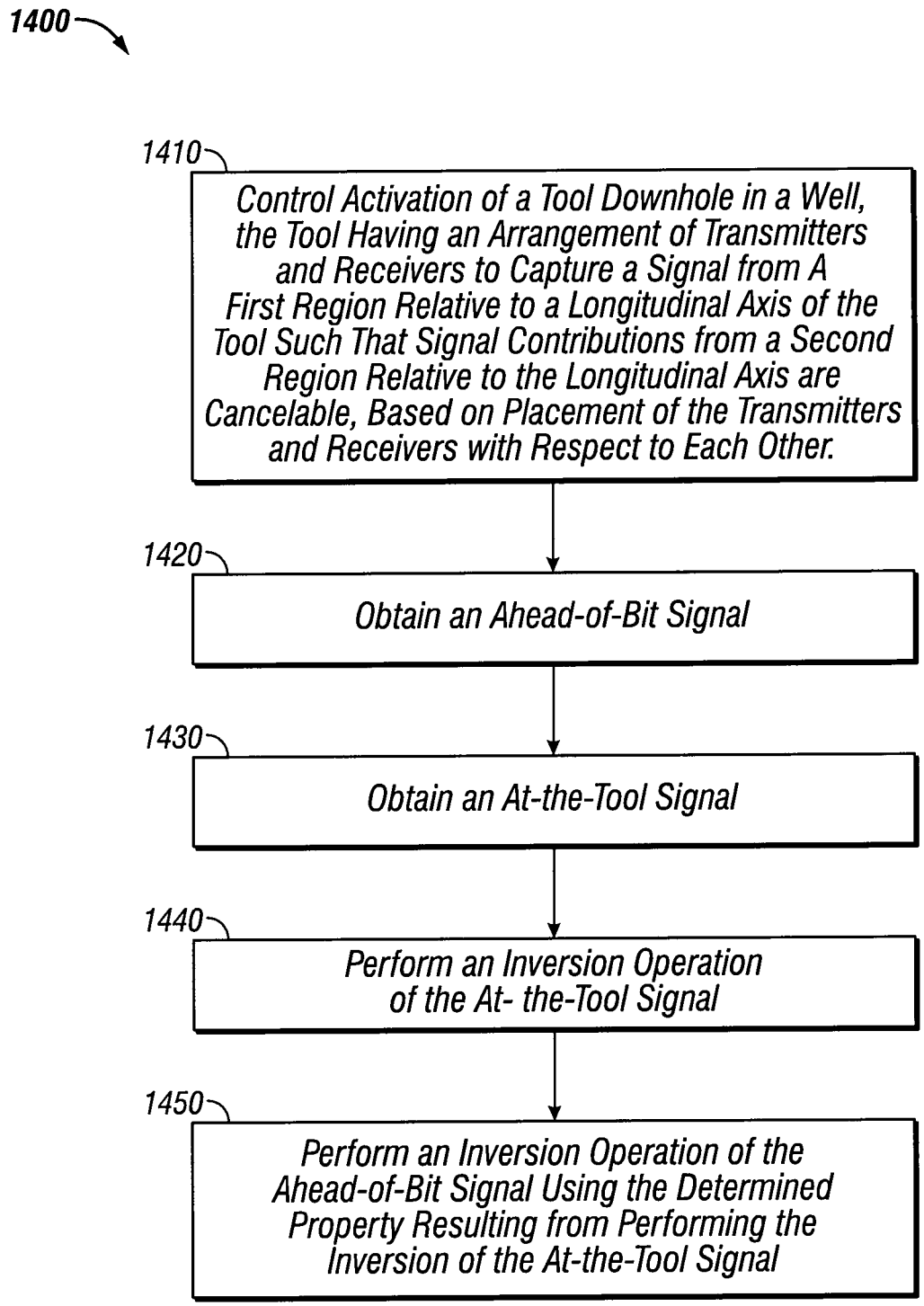
FIG. 14 shows features of an embodiment of a method using a tool to effectively optimize determination of formation properties ahead of a tool operatively disposed in a borehole, according to various embodiments.

FIG. 14 shows features of an embodiment of a method 1400 of using a tool to effectively optimize determination of formation properties ahead of a tool operatively disposed in a borehole. Method 1400 can be implemented such that it may include various of the features of the process flows discussed with respect to FIGS. 12 and 13. At 1410, controlled activation of a tool downhole in the well is conducted. The tool can be structured having an arrangement of transmitters and receivers to capture a signal from a first region relative to a longitudinal axis of the tool such that signal contributions from a second region relative to the longitudinal axis are cancelable, based on placement of the transmitters and receivers with respect to each other. The tool can be realized using features and associated processing activities similar to or identical to features of the tools discussed with respect to the Figures herein and their associated processing activities. Control of the activation of the tool can include electrically applying signals to transmitters of the tool in correlated magnitudes and polarity to perform subtraction and/or addition operations. Control of the activation of the tool can include applying current to two different transmitters of the tool simultaneously such that the current applied to one of the two transmitters is of the same amount and of opposite direction as in the other transmitter.

At 1420, an ahead-of-bit signal is obtained. The acquisition can be conducted such that contributions from direct transmitter-to-receiver signals and formation signals around the tool are cancelable to a first extent. At 1430, an at-the-tool signal is obtained. The acquisition can be conducted such that signal contributions from anomalies ahead of the tool are cancelable to a second extent.

At 1440, an inversion operation of the at-the-tool signal is performed. Such an inversion can be conducted to determine a property of the formation around the tool. Performing an inversion operation of the at-the-tool signal can include determining formation resistivity from around the tool. At 1440, an inversion operation of the ahead-of-bit signal is performed using the determined property resulting from performing the inversion of the at-the-tool signal. Such an inversion can be conducted such that performing the inversion of the ahead-of-bit signal generates one or more formation related properties ahead of the tool. Performing an inversion operation of the ahead-of-bit signal using the determined property can include determining resistivity from anomalies ahead of the tool. Performing an inversion operation of the ahead-of-bit signal using the determined property can include applying a forward model subjected to an iterative process. Performing the inversion of the at-the-tool signal can include obtaining horizontal resistivity and vertical resistivity of a formation and performing of the inversion of the ahead-of-bit signal can include obtaining elevation angle and distance to an anomaly.

In various embodiments, results from the generation of one or more formation related properties ahead of the tool using a method similar to or identical to method 1400 can be used to effect dynamic management of a drilling operation. Such results can be used to monitor resistivity from ahead of a drill bit and to correlate resistivity changes to changes in pressure ahead of the drill bit, determined from the monitoring. Results from the generation of one or more formation related properties ahead of the tool can be applied to steer a drilling operation. Steering a drilling operation allows for directing the drill operation to a desired region and away from unfavorable regions. A drilling operation can be stopped to make measurements using a tool configurable to be similar to or identical to the tools as discussed herein.

In various embodiments, a special configuration of sensor arrays and processing algorithms can be utilized to decouple signals associated with anomalies ahead of the drill bit from formation resistivity and the direct signal. In comparison to conventional analysis techniques, these decoupled signals may be more effectively used in inversion algorithms and they also may allow larger depth of detection. These processing schemes in conjunction with the special configurations of sensor arrays can be realized using simple addition and subtraction operations, which can be implemented as a part of electrical circuits. Such implementation can allow for elimination of some of the noise associated with data acquisition and can lead to significant increase in the dynamic range.

In anisotropic situations, various tools and corresponding inversion techniques, as discussed herein, can measure horizontal and vertical formation resistivity values. As opposed to conventional tools used for making similar measurements, both of these measurements can be made from collocated sensors, as shown in FIGS. 4, 8 and 9 for example, and such measurements are expected to produce more stable and consistent results, such as in calculating the dip angle of the formation. The various tools and associated processing schemes described herein may achieve earlier and more reliable warnings in avoiding dangerous situations such as blowouts than may be provided by conventional tools. The various tools and associated processing schemes described herein may also facilitate accurate and deep evaluation of layers in the formation.

Figure 15:
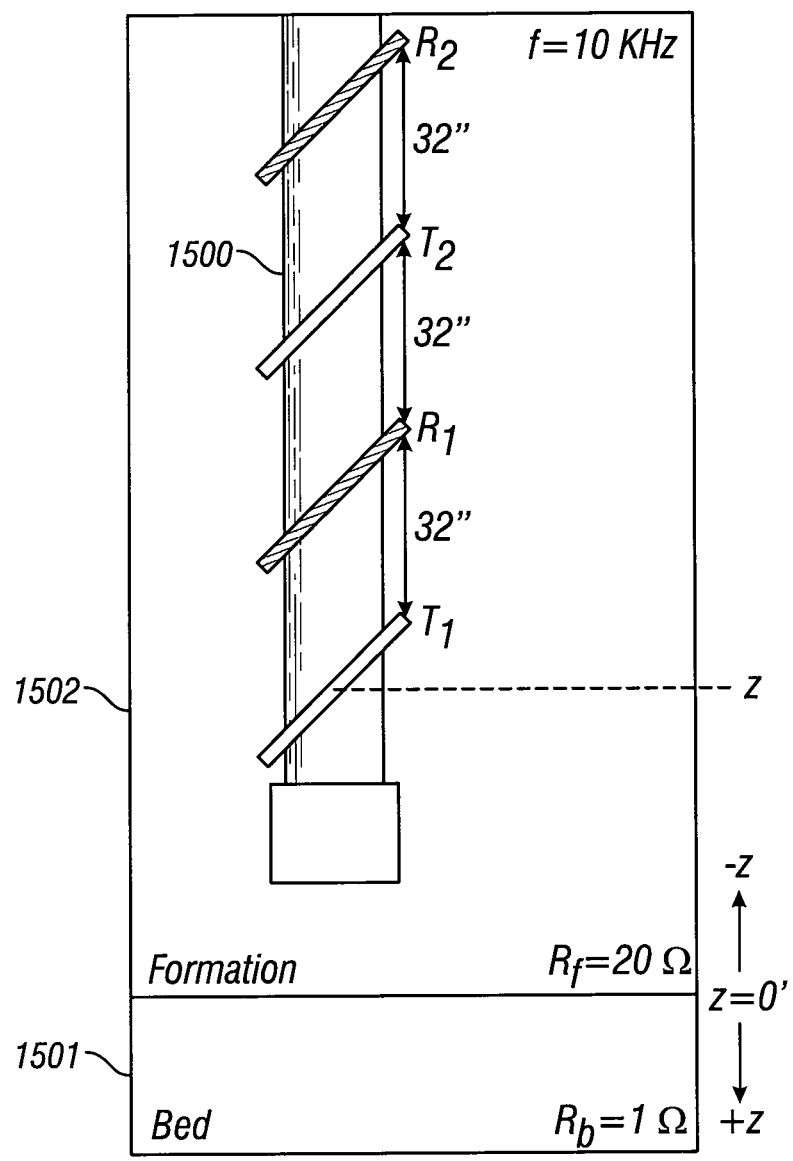
FIG. 15 shows a test setup of an embodiment of a tool with respect to two layers.

FIG. 15 shows a test setup of a tool 1500 with respect to two layers 1501 and 1503. Layer 1501 is a formation with resistivity $R_f=20\Omega$ and layer 1503 is a horizontal bed with resistivity $R_b=1\Omega$. The true vertical depth is measured from the bed boundary as shown in FIG. 15. Tool 1500 having arrangement 505 of FIG. 5 is used with a 32" separation between the sensors, elevation $\theta=0°$, and a frequency f=10 KHz. The depth of the tool is measured from its lowest sensor $T_1$. FIG. 15 shows example separations and operating frequency. Other frequencies can be used and other separation distances for arrangement 505 can be used.

Figure 16:
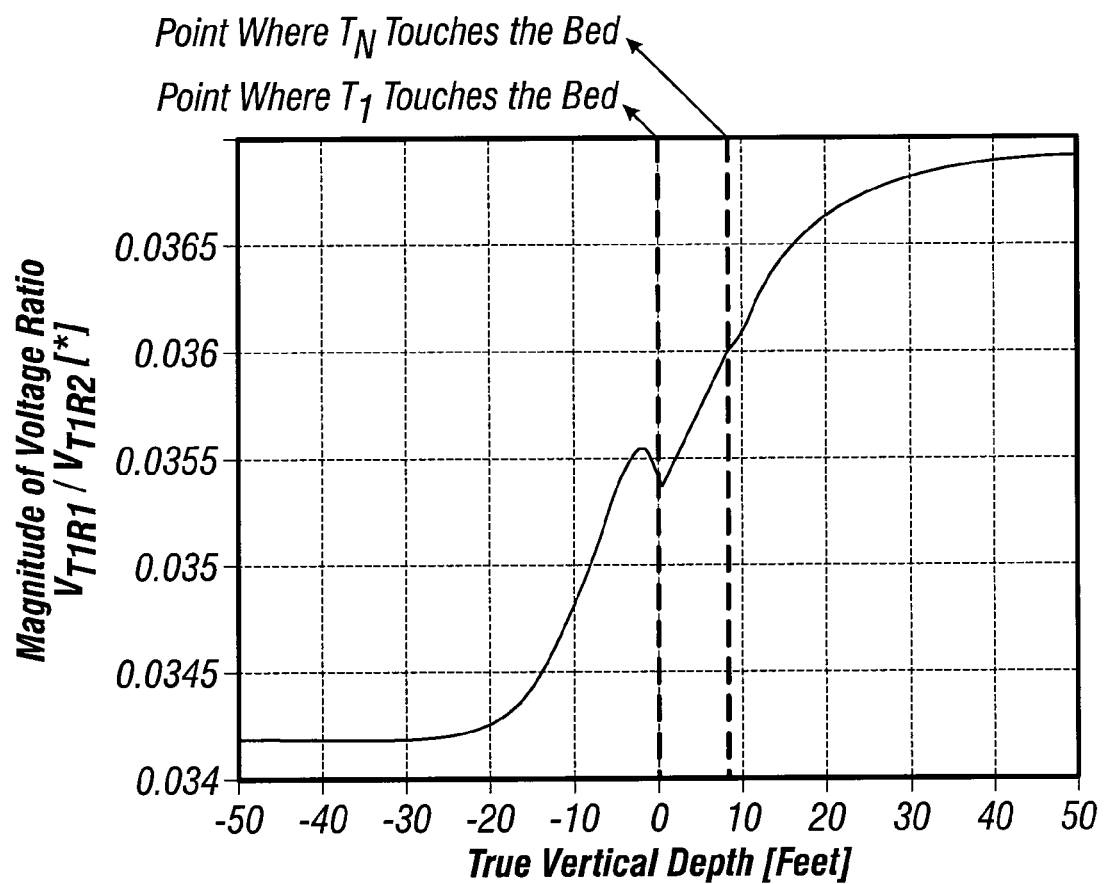
FIGS. 16-19 show the logging data and inversion results associated with the test setup of FIG. 15.
Figure 17:
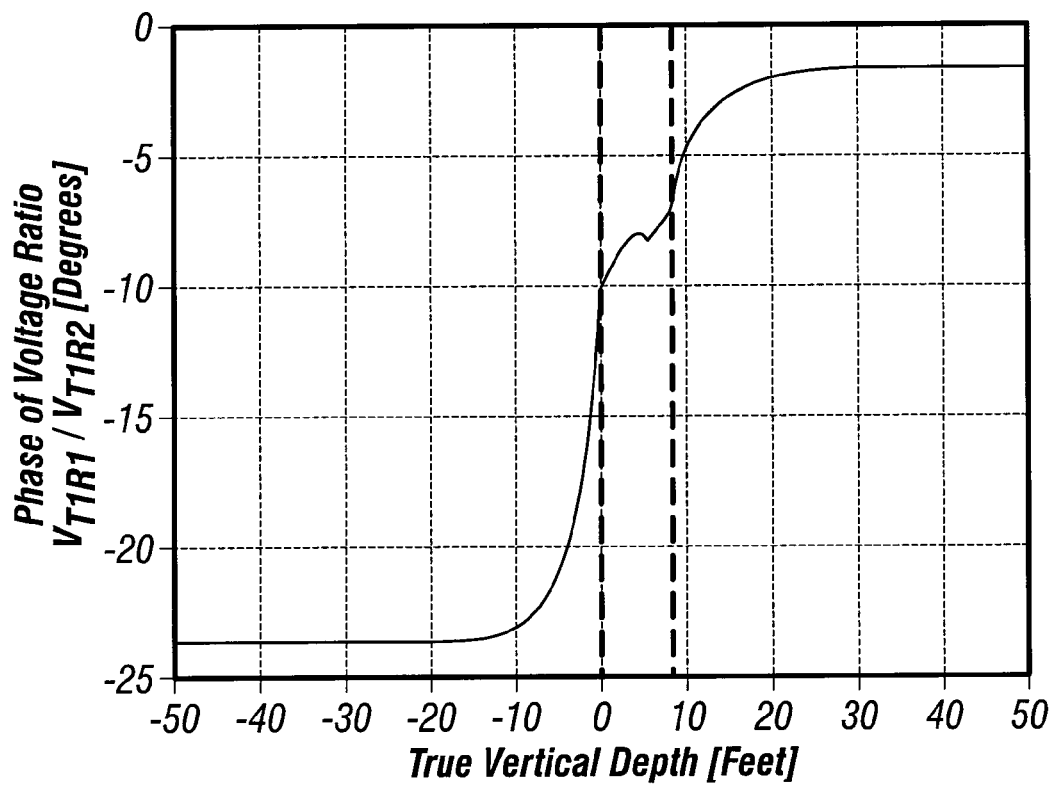

FIGS. 16-19 show logging data and inversion results associated with the test setup of FIG. 15. FIGS. 16 and 17 show an amplitude ratio $|V_{T1R1}/V_{T1R2}|$ and phase difference (phase $(V_{T1R2})$–phase $(V_{T1R2})$) that are employed in a conventional LWD tool. It can be seen from these figures that amplitude ratio and phase difference are affected not only by the resistivity at the tool location but also by the layer boundary ahead of the bit. It can be concluded that effects of formation resistivity and anomalies ahead of the bit are coupled in conventional signals used in the conventional LWD. As a result, for the conventional process, calculation of formation and anomaly parameters are usually performed by a multiple-layer inversion algorithm that utilizes multiple logging points.

Figure 18:
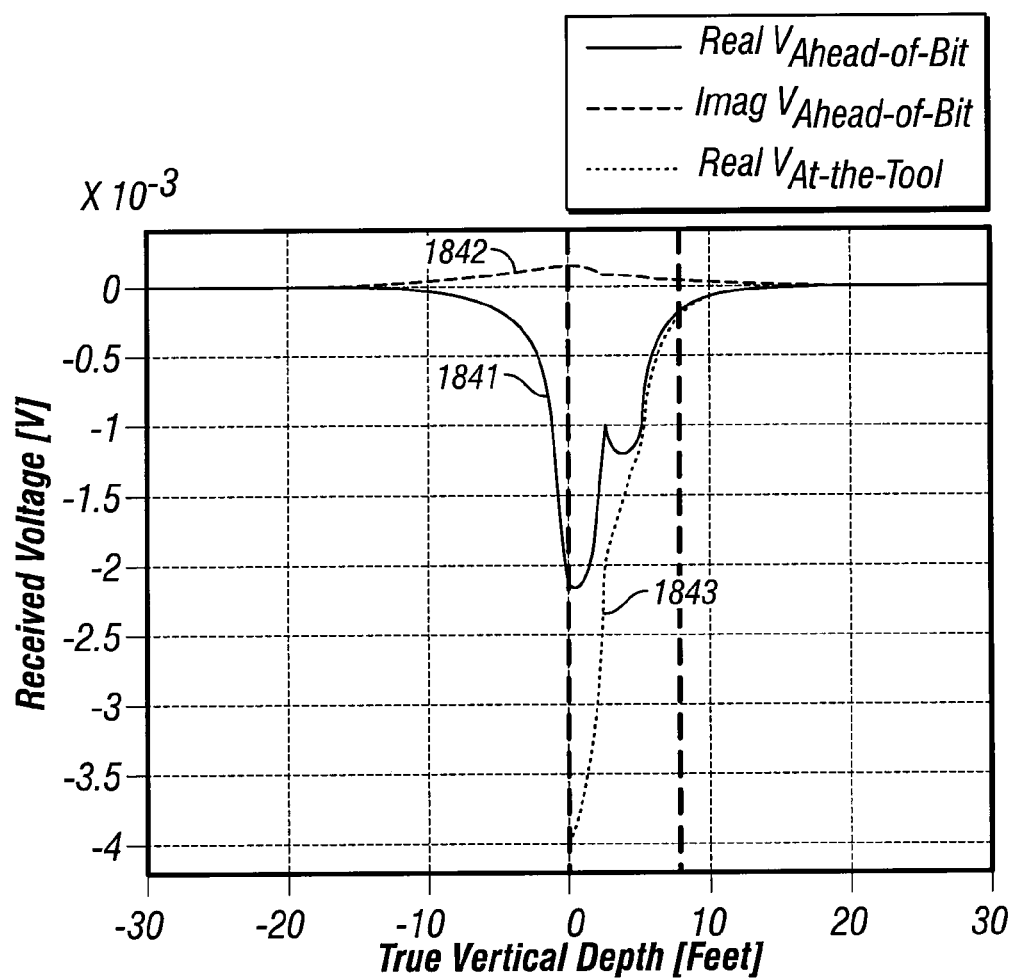
Figure 19:
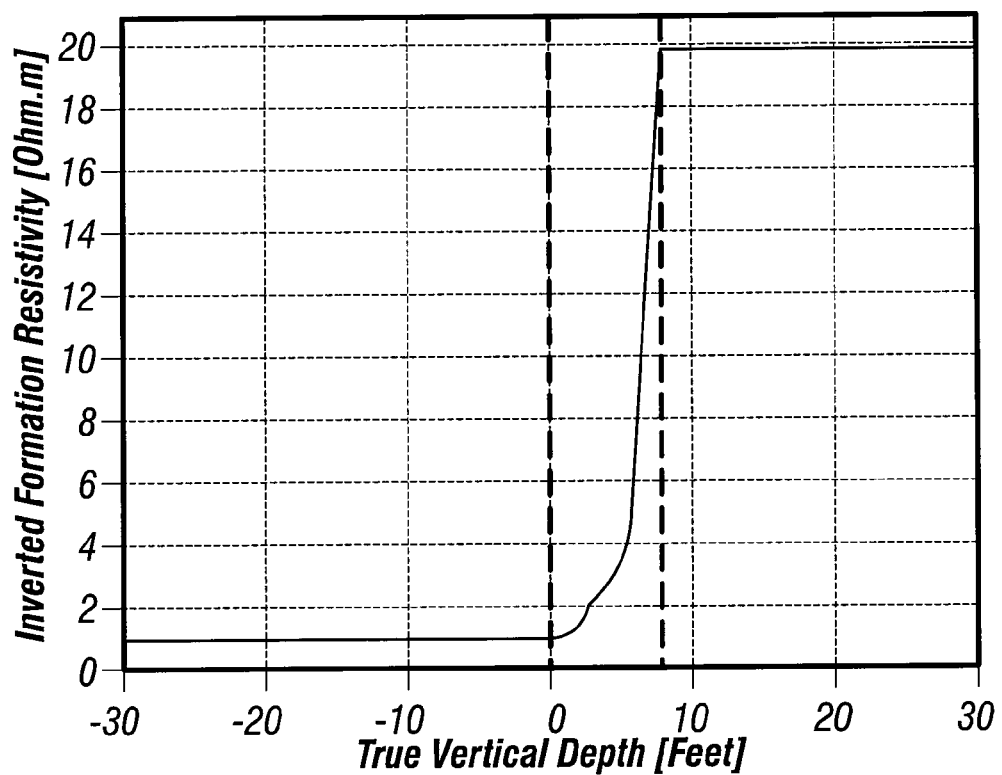

FIG. 18 shows the ahead-of-bit and at-the-tool signals associated with the test setup of FIG. 15. Curve 1841 shows the real component of the $V_{AoB}$ signal and curve 1842 shows the imaginary component of the $V_{AoB}$ signal. Curve 1843 shows the real component of the $V_{AtT}$ signal. As it can be seen in FIG. 18, the ahead-of-bit signal is only affected by the presence of the layer and decreases exponentially as the tool moves away from the boundary. Similarly, the at-the-tool signal is only affected by the resistivity value in between the lowest and highest sensors of the tool and it is not sensitive to the presence of the layers ahead of the bit. An accurate measurement of formation resistivity can be made by using the at-the-tool signal even when the tool is very close to the layer boundary. For example, FIG. 19 shows an inverted resistivity obtained via a single layer inversion on the real part of the at-the-tool signal. Even though no shoulder bed correction is applied, the result is not affected by the presence of a layer that is ahead of the bit, due to the decoupling effect of processes shown in FIGS. 12-14 with respect to sensor arrangement 505 or other sensor arrangements associated with FIGS. 1-11. It is noted here that results are still affected by the presence of layers that are crossing the tool, i.e., crossing the lowest sensor at z=0 feet and highest sensor at z=8 feet of the tool.

Figure 20:
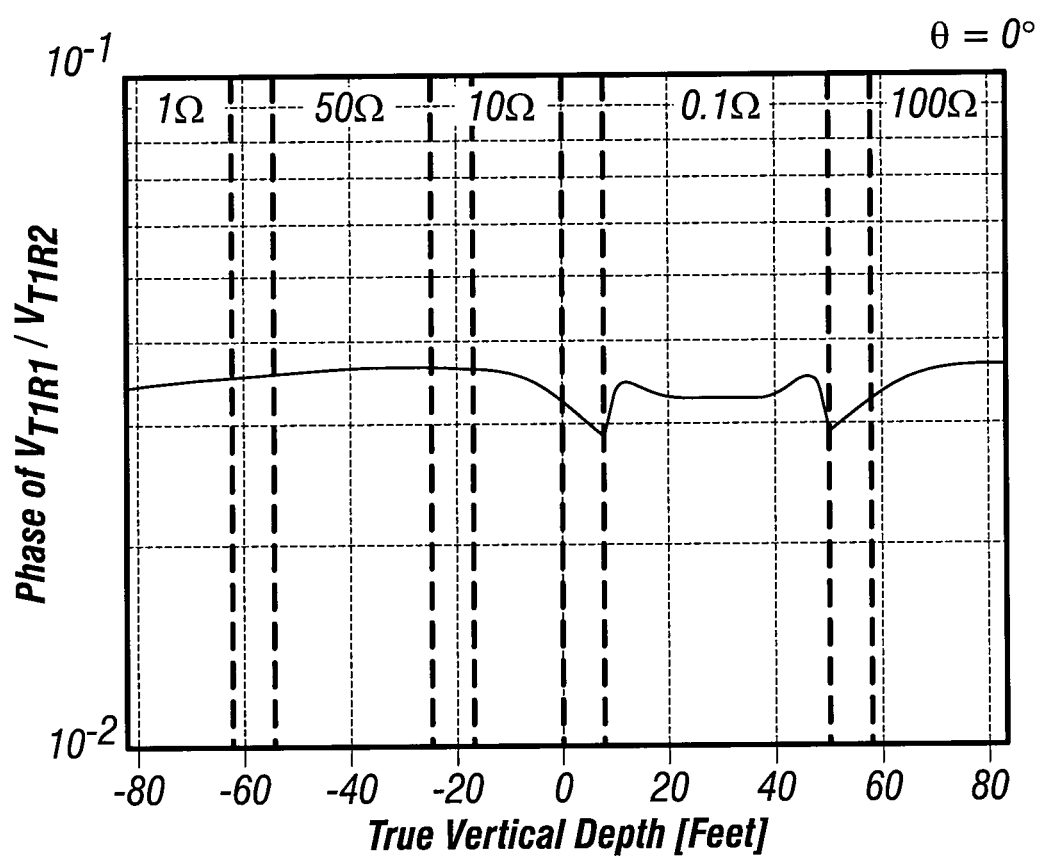
FIGS. 20-23 show logging data and inversion results of a test setup with 5 layers, which have different resistivities, using the tool of FIG. 15.
Figure 21:
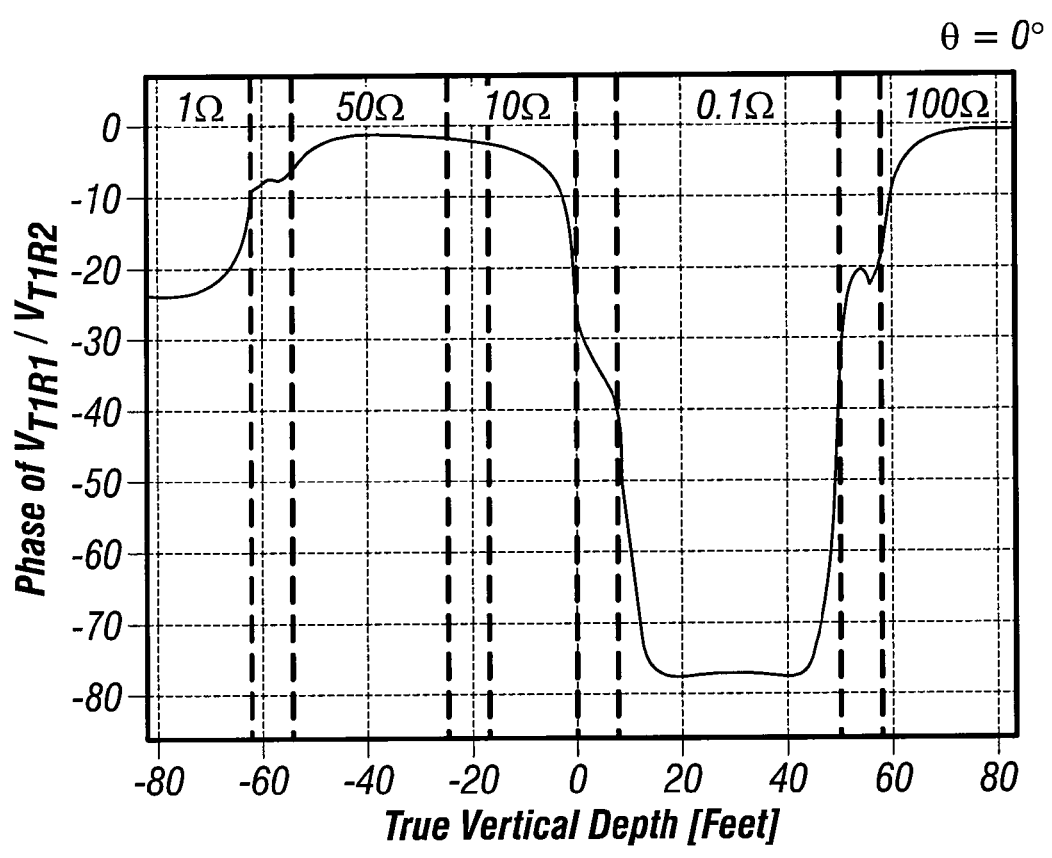

FIGS. 20-23 show logging data and inversion results of a test setup with 5 layers, which have different resistivities, using tool 1500 of FIG. 15. The resistivity of each of the 5 layers is shown in FIGS. 20-23. FIGS. 20 and 21 show an amplitude ratio $|V_{T1R1}/V_{T1R2}|$ and phase difference (phase ($V_{T1R1}$)−phase ($V_{T1R2}$)) that is employed in a conventional LWD tool. It can be seen from these plots that locations of layer boundaries and resistivity values associated with layers cannot be straightforwardly obtained without an inversion algorithm that incorporates the shoulder effects.

Figure 22:
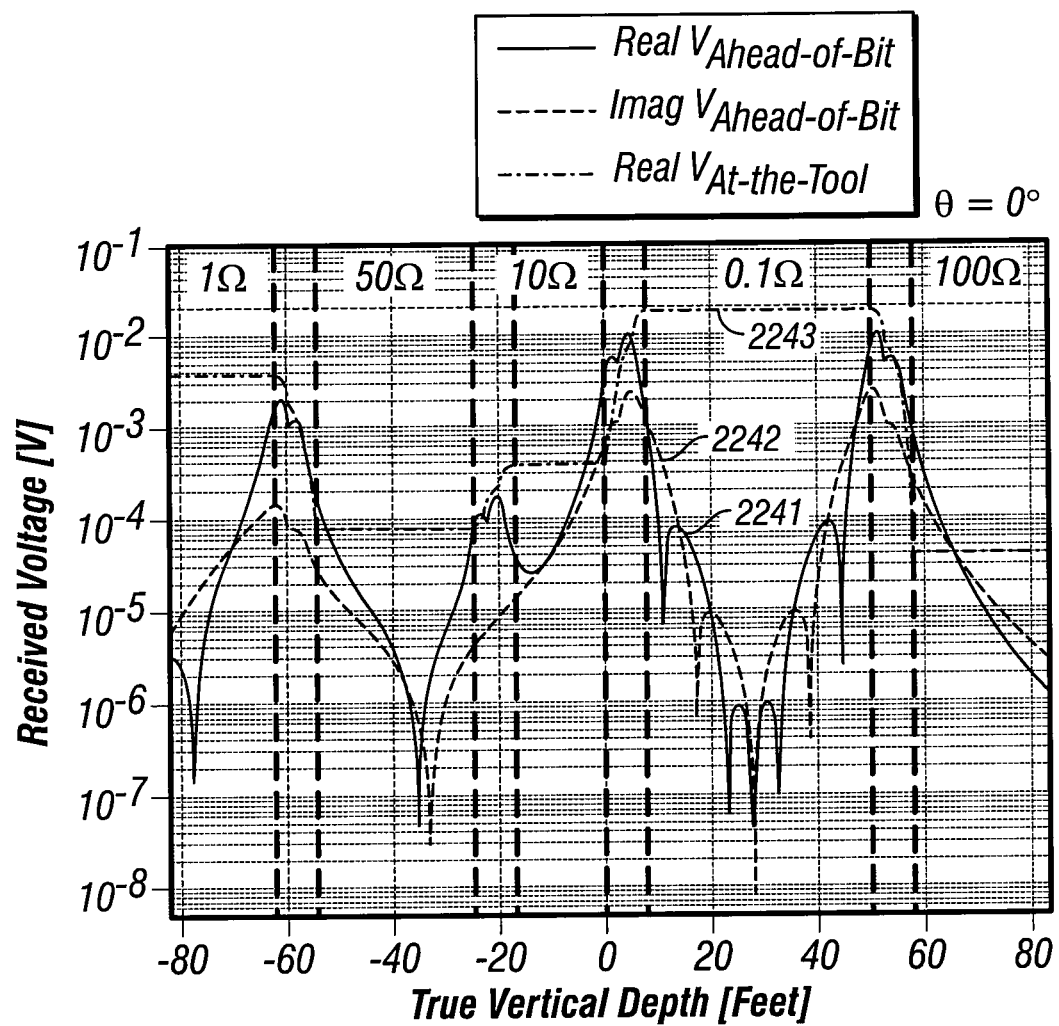

FIG. 22 shows the ahead-of-bit and at-the-tool signals of arrangement 505 of FIG. 15 and its associated processing as discussed. In FIG. 22, it can be seen that individual layers can easily be identified in the real part 2243 of the at-the-tool signal as flat regions. Moreover, layer boundaries can be identified as the maximums of the ahead-of-bit signal having real part 2241 and imaginary part 2242.

Figure 23:
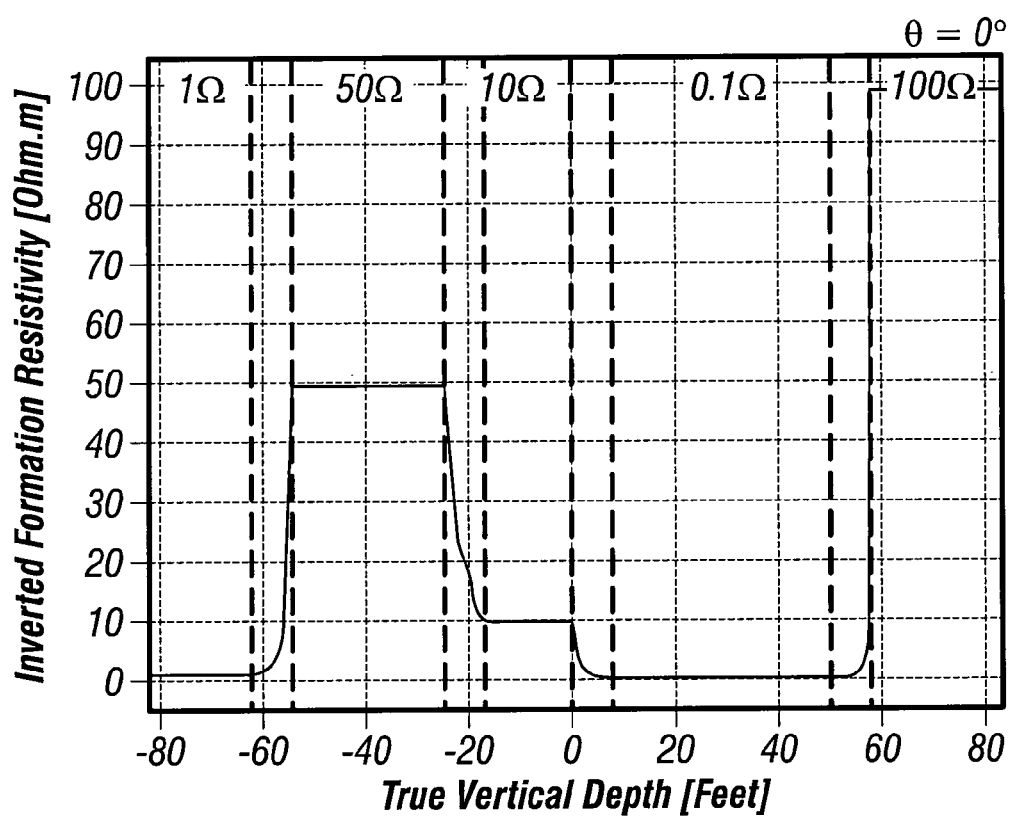

FIG. 23 shows the inverted resistivity values obtained by applying a single layer inversion on the at-the-tool signal. Even though no correction is used for shoulder effects (no multiple-layer inversion is used), resistivity of individual layers can be extracted with high accuracy due to the decoupling effect of processes shown in FIGS. 12-14 with respect to sensor arrangement 505 or other sensor arrangements associated with FIGS. 1-11. Thus, it can be seen from FIGS. 15-23 that tools and associated methods similar or identical to the tools and methods discussed with respect to FIGS. 1-14 provide decoupled ahead-of-bit and formation measurement in comparison with conventional tools and associated procedures.

Figure 24:
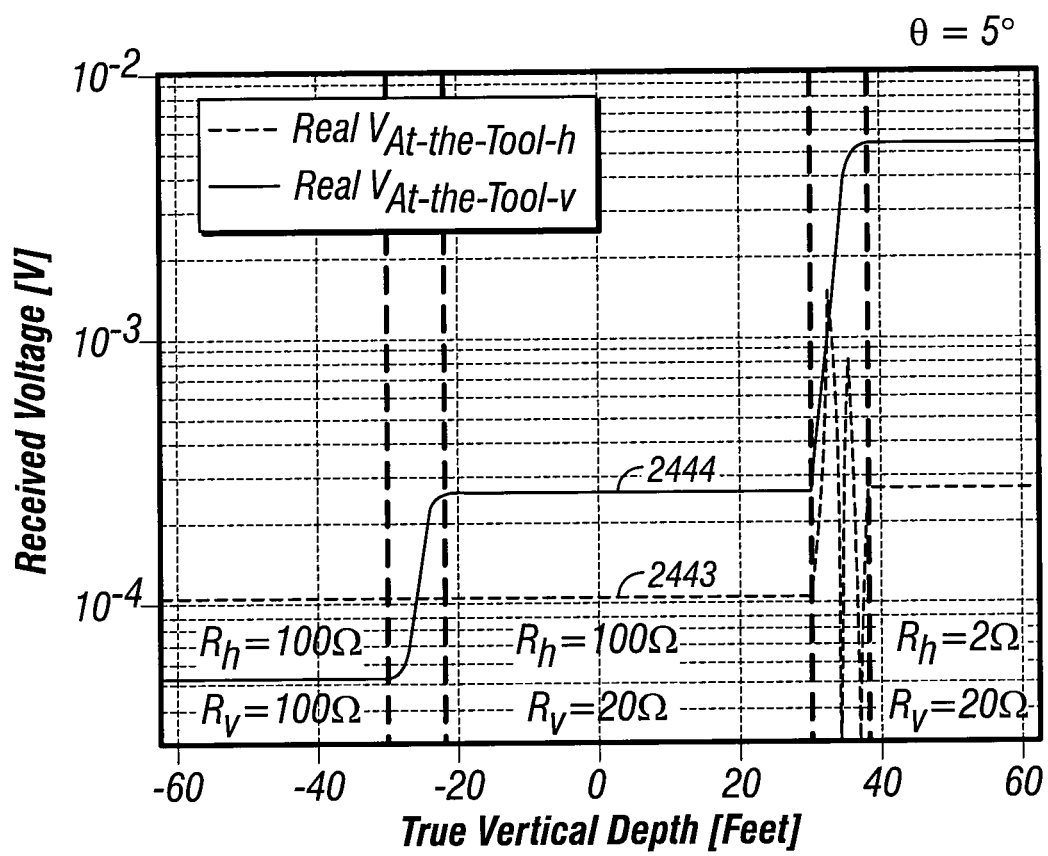
FIGS. 24 and 25 show horizontal and vertical at-the-tool and ahead-of-bit signals for a test setup using the arrangement of FIG. 8.
Figure 25:
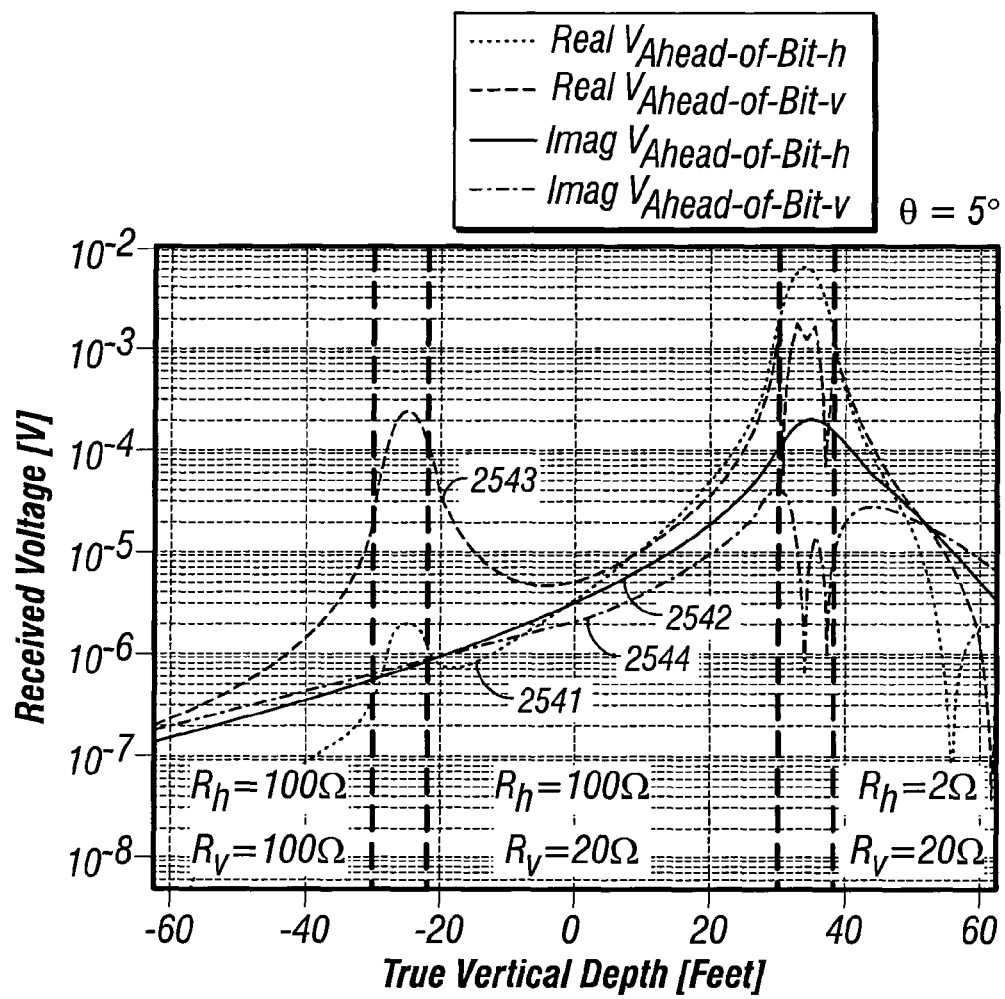

FIGS. 24 and 25 show horizontal and vertical at-the-tool and ahead-of-bit signals for a test setup. The test setup is configured for a tool having sensor arrangement 805 shown in FIG. 8 with a sensor separation of 32" and a tool dip of 5° operating at 10 KHz with horizontal and vertical at-the-tool and ahead-of-bit signals as given in equations (13)-(16) for the tool. A three layer logging problem is considered in the test setup with horizontal and vertical resistivity values as shown in FIGS. 24 and 25. It can be seen from FIG. 24 that the real part 2443 of the horizontal at-the-tool measurement is highly sensitive to the horizontal resistivity value near the tool, while the real part 2444 of the vertical at-the-tool measurement is highly sensitive to the vertical resistivity value near the tool. Both of these signals are not affected by presence of layers ahead of the bit.

FIG. 25 shows the real part 2541 of the horizontal ahead-of-bit signal, the imaginary part 2542 of the horizontal ahead-of-bit signal, the real part 2543 of the vertical ahead-of-bit signal, and the imaginary part 2544 of the vertical ahead-of-bit signal. In this case, although these signals do not give explicit information similar to the at-the-tool measurement, they can be used to effectively recover horizontal and vertical resistivity, the dip angle, and distance to the layer ahead of the bit. FIGS. 24 and 25 indicate that tools and associated methods similar or identical to the tools and methods discussed herein provide decoupled, accurate anisotropic measurements in comparison with conventional tools and associated procedures.

Figure 26:
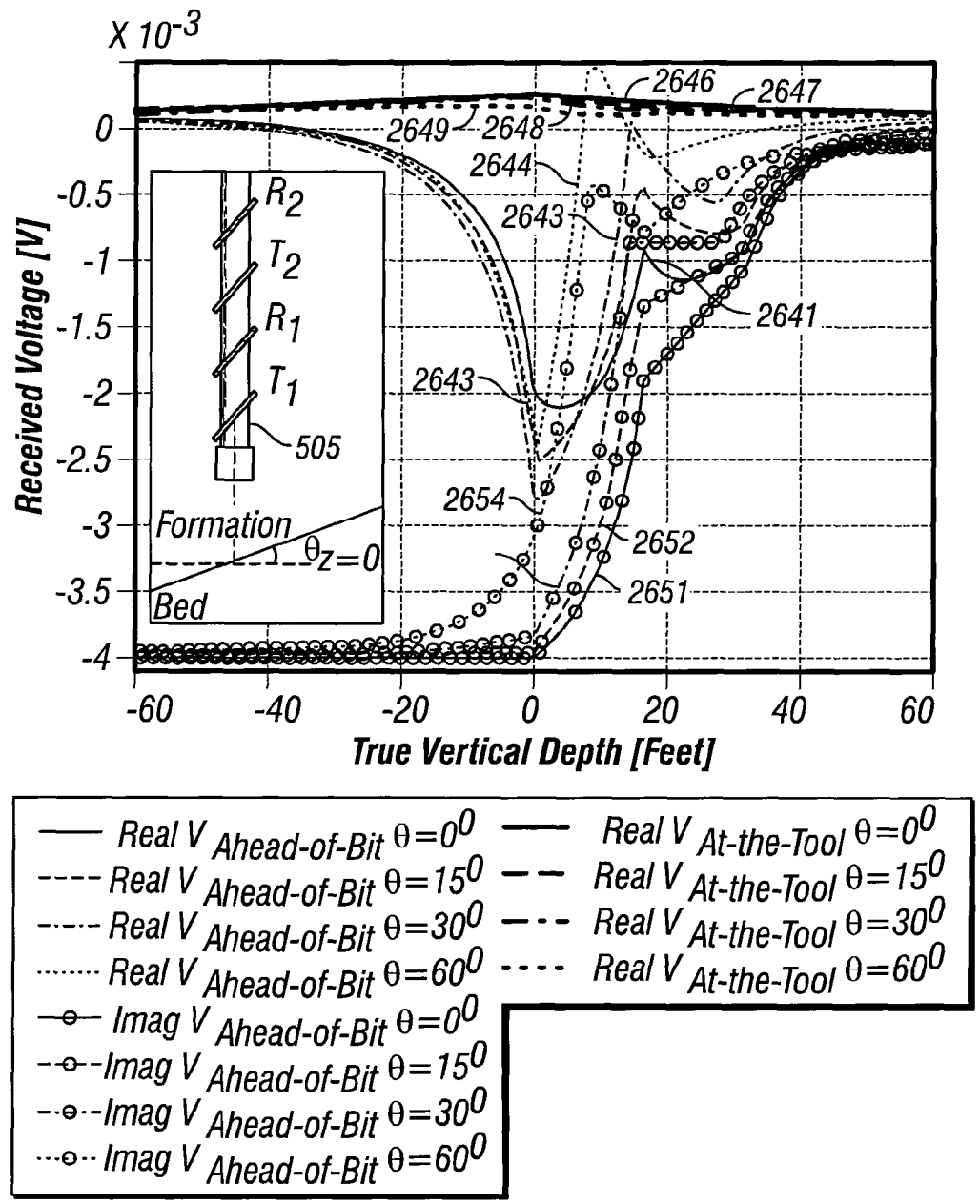
FIG. 26 shows logging results for ahead-of-bit and at-the-tool signals for different dip angles using the arrangement of FIG. 5.

FIG. 26 shows logging results for ahead-of-bit and at-the-tool signals for different dip angles using arrangement 505 of FIG. 5. Curve 2641 is the real part of $V_{AoB}$ at θ=0°. Curve 2642 is the real part of $V_{AoB}$ at θ=15°. Curve 2643 is the real part of $V_{AoB}$ at θ=30°. Curve 2644 is the real part of $V_{AoB}$ at θ=60°. Curve 2646 is the imaginary part of $V_{AoB}$ at θ=0°. Curve 2647 is the imaginary part of $V_{AoB}$ at θ=15°. Curve 2648 is the imaginary part of $V_{AoB}$ at θ=30°. Curve 2649 is the imaginary part of $V_{AoB}$ at θ=60°. Curve 2651 is the real part of $V_{AtT}$ at θ=0°. Curve 2652 is the real part of $V_{AtT}$ at θ=15°. Curve 2653 is the real part of $V_{AtT}$ at θ=30°. Curve 2654 is the real part of $V_{AtT}$ at θ=60°. As discussed before, it can be seen from FIG. 26 that, for zero dip angle, at-the-tool signal is highly insensitive to the layer ahead of the bit. However for higher dip angles, some sensitivity is observed, which points to a degradation in the decoupling effect. This degradation becomes significant only if the dip is larger than about 30 degrees. As a result, the tools having arrangement 505 with associated processing are expected to be effective for all cases except those with dip angles larger than 30 degrees.

Figure 27:
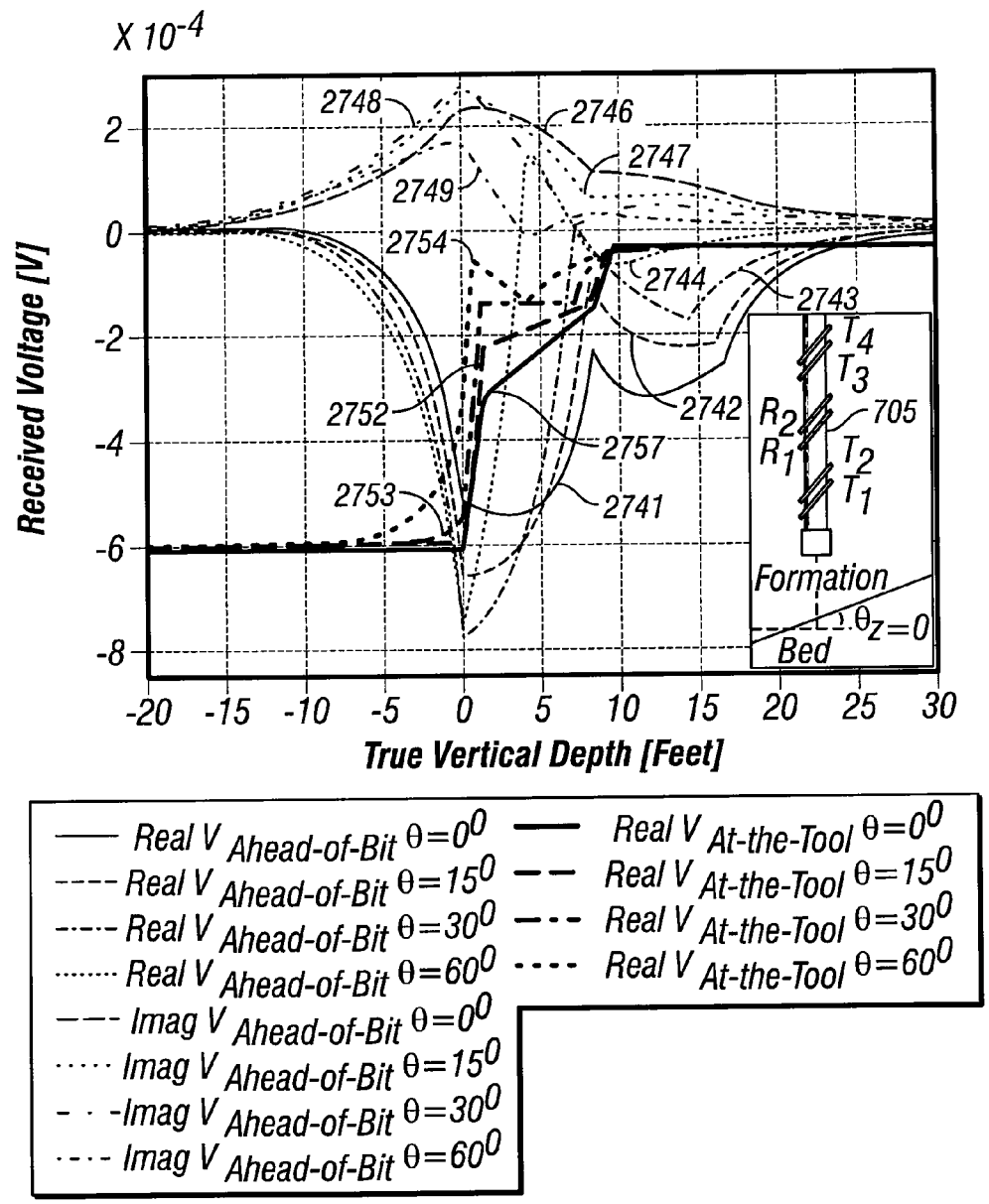
FIG. 27 shows logging results for ahead-of-bit and at-the-tool signals for different dip angles using the arrangement of FIG. 7.

FIG. 27 shows logging results for ahead-of-bit and at-the-tool signals for different dip angles using arrangement 705 of FIG. 7. Curve 2741 is the real part of $V_{AoB}$ at θ=0°. Curve 2742 is the real part of $V_{AoB}$ at θ=15°. Curve 2743 is the real part of $V_{AoB}$ at θ=30°. Curve 2744 is the real part of $V_{AoB}$ at θ=60°. Curve 2746 is the imaginary part of $V_{AoB}$ at θ=0°. Curve 2747 is the imaginary part of $V_{AoB}$ at θ=15°. Curve 2748 is the imaginary part of $V_{AoB}$ at θ=30°. Curve 2749 is the imaginary part of $V_{AoB}$ at θ=60°. Curve 2741 is the real part of $V_{AtT}$ at θ=0°. Curve 2752 is the real part of $V_{AtT}$ at θ=15°. Curve 2753 is the real part of $V_{AtT}$ at θ=30°. Curve 2754 is the real part of $V_{AtT}$ at θ=60°. Similar to the tool based on arrangement 505 of FIG. 5, the process associated using arrangement 705 of FIG. 7 is effective here as long as the dip angle is lower than or equal to 30 degrees.

As it is seen in FIGS. 18, 22, 25, 26, and 27, ahead-of-bit measurement is free of direct field effects that produce higher noise levels. As a result, the only criterion in detection of anomalies ahead of the bit is to have an anomaly signal level that is larger than the noise level. As an example, in FIG. 22, a noise level at $10^{-6}$ V would produce approximately 10 and 25 feet depth of detection when moving from 50Ω to 10Ω and 0.1Ω to 100Ω layers, respectively. The tools and associated processes described herein may provide higher depth of detection in see-ahead problems than conventional tools and their associated procedures.

The tools and associated processes described herein can improve the depth of detection and stability of the ahead of the bit measurements, which provides important information regarding drastic changes in the pressure in the layers ahead of the bit. As a result, an early reliable warning regarding any blow-out risk can be made and appropriate measures can be taken in time. This can be important when conditions downhole can only be transmitted to the surface via a telemetry system, which has considerable delays. The tools and associated processes described herein may provide a mechanism for an enhanced level of prevention of dangerous situations, such as blow-outs, as compared with conventional tools and their associated procedures.

The tools and associated processes described herein can decouple the direct and formation signals from the ahead-of-the-bit signal, which leads to better evaluation of formations ahead of the bit and near the tool. Moreover, such tools and associated processes can make accurate and stable measurements of anisotropy. As a result it can help in assessment of productive zones. The tools and associated processes described herein may provide a mechanism for recovery of hydrocarbons to an enhanced level as compared with conventional tools and their associated procedures.

Various components of a measurement tool and a processing unit that decouples the direct and formation signals from the ahead-of-the-bit signal, as described herein or in a similar manner, can be realized in combinations of hardware and software implementations. These implementations may include a machine-readable medium having machine-executable instructions, such as a computer-readable medium having computer-executable instructions, for operating the system to control activation of a tool downhole in the well; to obtain an ahead-of-bit signal such that contributions from direct transmitter-to-receiver signals and formation signals around the tool are cancelable to a first extent; to obtain an at-the-tool signal such that signal contributions from anomalies ahead of the tool are cancelable to a second extent; to perform an inversion operation of the at-the-tool signal to determine a property of the formation around the tool; and to perform an inversion operation of the ahead-of-bit signal using the determined property resulting from the performing of the inversion of the at-the-tool signal such that performing the inversion of the ahead-of-bit signal generates one or more formation related properties ahead of the tool. The instructions can include selecting and activating transmitters and directing acquisition of signals at receivers selected with respect to the selected transmitter activated. The controlled tool can have an arrangement of transmitters and receivers to capture a signal from a first region relative to a longitudinal axis of the tool such that signal contributions from a second region relative to the longitudinal axis are cancelable based on placement of the transmitters and receivers with respect to each other.

Controlling activation of the tool can include applying signals to transmitters of the tool electrically in correlated magnitudes and polarity to perform subtraction and/or addition operations. Controlling activation of the tool can include applying current to two different transmitters of the tool simultaneously such that the current applied to one of the two transmitters is of a same amount and of opposite direction as in the other transmitter.

The instructions can be executed by a controller, or processor, to manage the inversion operation of the at-the-tool signal to determine formation resistivity from around the tool. The instructions can be executed by a controller, or processor, to manage the inversion operation of the ahead-of-bit signal using the determined property to determine resistivity from anomalies ahead of the tool. The instructions can be executed to apply a forward model subjected to an iterative process to perform an inversion operation of the ahead-of-bit signal using the determined property from inversion of the at-the-tool signal. The instructions for performing the inversion of the at-the-tool signal can include obtaining horizontal resistivity and vertical resistivity of a formation. The instructions for performing the inversion of the ahead-of-bit signal can include obtaining elevation angle and distance to an anomaly.

The instructions can include monitoring resistivity from ahead of a drill bit and correlating resistivity changes, determined from the monitoring, to determine changes in pressure ahead of the drill bit. The instructions can include commands to steer a drilling operation in response to applying results from the generation of the one or more formation related properties ahead of the tool. The instructions can include stopping a drilling operation to make measurements using the tool.

Figure 28:
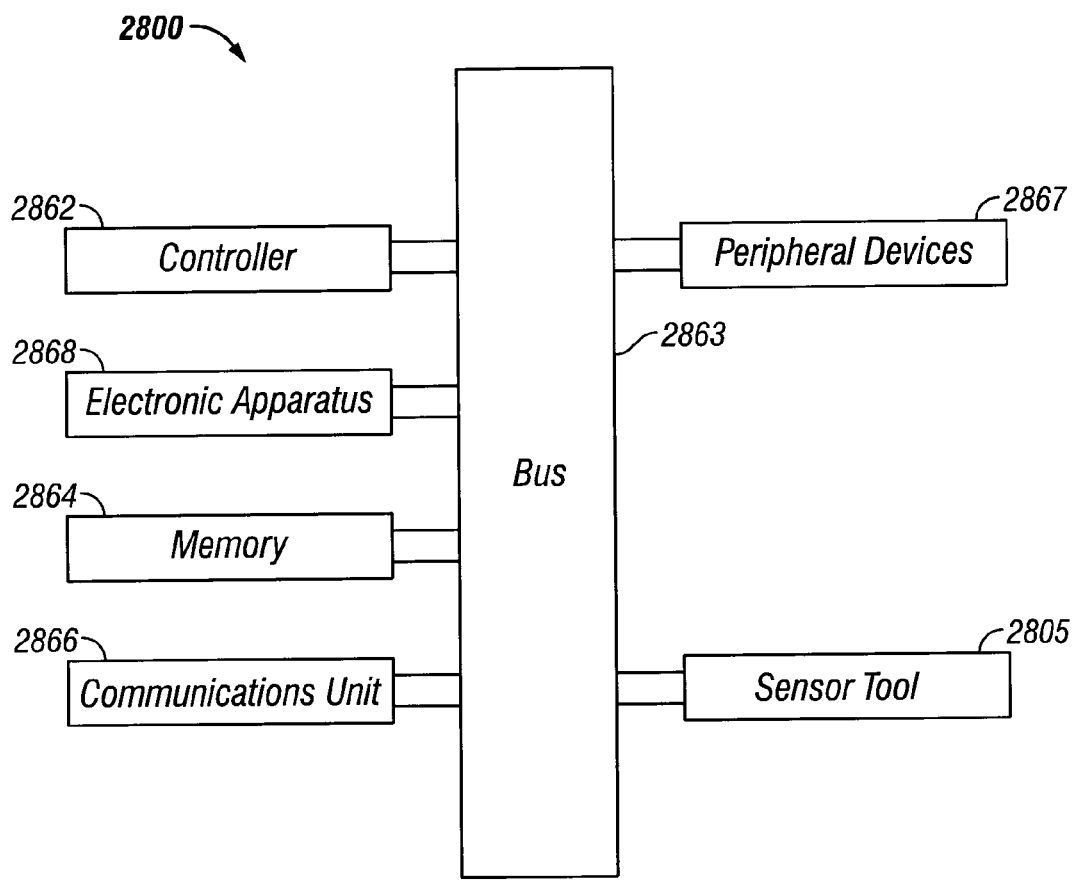
FIG. 28 depicts a block diagram of features of an embodiment of a system to control activation of arrangements of sensors and process received signals to decouple ahead-of-bit signals from at-the-tool signals to determine properties ahead of the drill bit, according to various embodiments.

FIG. 28 depicts a block diagram of features of an embodiment of a system 2800 including a sensor tool 2805 having an arrangement of transmitters and receivers in which measurement signals can be acquired such that the direct and formation signals can be decoupled from the ahead-of-the-bit signal. The arrangements of transmitters and receivers of sensor tool 2805 can be realized in similar or identical manner to arrangements discussed herein.

System 2800 can also include a controller 2862, a memory 2864, an electronic apparatus 2868, and a communications unit 2866. Controller 2862, memory 2864, and communications unit 2866 can be arranged to operate sensor tool 2805 to determine properties of the region ahead of sensor tool 2805. With sensor tool 2805 affixed to a drill string close to or at the drill bit, the region ahead of sensor tool 2805 is the region ahead of the drill bit. Controller 2862, memory 2864, and electronic apparatus 2868 can be realized to include control activation of transmitter antennas and selection of receiver antennas in sensor tool 2805 and to manage processing schemes in accordance with measurement procedures and signal processing as described herein. Communications unit 2866 can include downhole communications in a drilling operation. Such downhole communications can include a telemetry system.

System 2800 can also include a bus 2863, where bus 2863 provides electrical conductivity among the components of system 2800. Bus 2863 can include an address bus, a data bus, and a control bus, each independently configured. Bus 2863 can also use common conductive lines for providing one or more of address, data, or control, the use of which can be regulated by controller 2862. Bus 2863 can be configured such that the components of system 2800 are distributed. Such distribution can be arranged between downhole components such as transmitters and receivers of sensor tool 2805 and components that can be disposed on the surface. Alternatively, the components can be co-located such as on one or more collars of a drill string or on a wireline structure.

In various embodiments, peripheral devices 2867 can include displays, additional storage memory, and/or other control devices that may operate in conjunction with controller 2862 and/or memory 2864. In an embodiment, controller 2862 is a processor. Peripheral devices 2867 can be arranged with a display can be used with instructions stored in memory 2864 to implement a user interface to manage the operation of sensor tool 2805 and/or components distributed within system 2800. Such a user interface can be operated in conjunction with communications unit 2866 and bus 2863. Various components of system 2800 can be integrated with sensor tool 2805 such that processing identical to or similar to the processing schemes discussed with respect to various embodiments herein can be performed downhole in the vicinity of the measurement.

Figure 29:
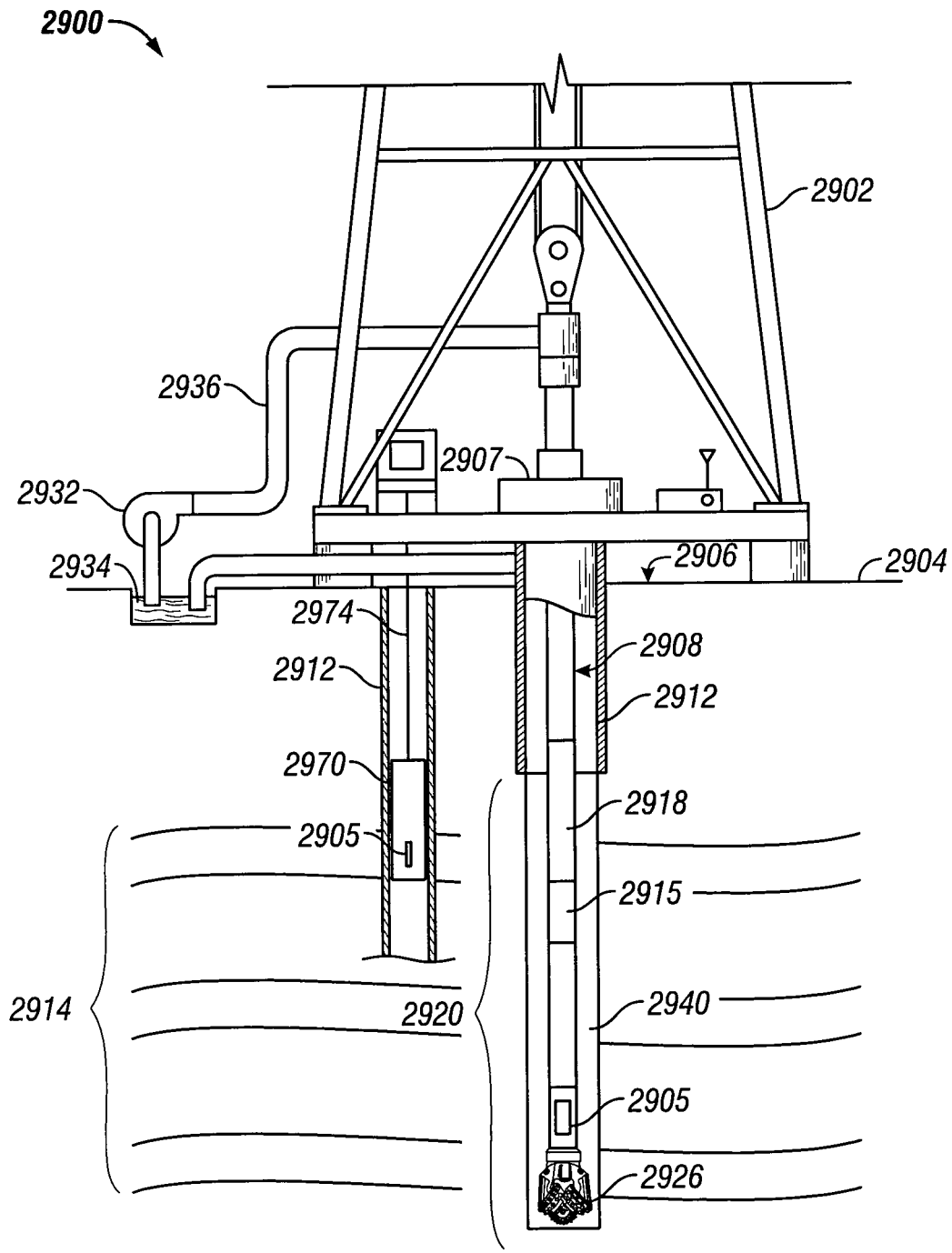
FIG. 29 depicts an embodiment of a system at a drilling site, according to various embodiments.

FIG. 29 depicts an embodiment of a system 2900 at a drilling site, where system 2900 includes a sensor tool 2905 having an arrangement of transmitters and receivers in which measurement signals can be acquired such that the direct and formation signals can be decoupled from the ahead-of-the-bit signal to determine properties ahead of the drilling operation. The arrangements of transmitters and receivers of sensor tool 2905 can be realized in similar or identical manner to arrangements discussed herein. Sensor tool 2905 can be realized as system 2900.

System 2900 can include a drilling rig 2902 located at a surface 2904 of a well 2906 and a string of drill pipes, that is, drill string 2908, connected together so as to form a drilling string that is lowered through a rotary table 2907 into a wellbore or borehole 2912. The drilling rig 2902 can provide support for drill string 2908. The drill string 2908 can operate to penetrate rotary table 2907 for drilling a borehole 2912 through subsurface formations 2914. The drill string 2908 can include drill pipe 2918 and a bottom hole assembly 2920 located at the lower portion of the drill pipe 2918.

The bottom hole assembly 2920 can include drill collar 2915, sensor tool 2905, and a drill bit 2926. In various embodiments, sensor tool 2905 can include a sensor located as close as possible to drill bit 2926. The drill bit 2926 can operate to create a borehole 2912 by penetrating the surface 2904 and subsurface formations 2914. Sensor tool 2905 can be structured for an implementation in the borehole of a well as a MWD system such as a LWD system. Sensor tool 2905 can be realized with a housing containing electronics to activate a transmitting source and to collect responses at selected receiving sensors. Such electronics can include a processing unit to analysis signals collected by sensor tool 2905 and provide processed results to the surface over a standard communication mechanism for operating a well. Alternatively, electronics can include a communications interface to provide signals sensed by sensor tool 2905 to the surface over a standard communication mechanism for operating a well, where these sensed signals can be analyzed at a processing unit at the surface.

In various embodiments, sensor tool 2905 may be included in a tool body 2970 coupled to a logging cable 2974 such as, for example, for wireline applications. Tool body 2970 containing sensor tool 2905 can include electronics to activate a transmitting sensor of sensor tool 2905 and collect responses from selected receiving sensors of sensor tool 2905. Such electronics can include a processing unit to analysis signals collected by sensor tool 2905 and provide processed results to the surface over a standard communication mechanism for operating in a well. Alternatively, electronics can include a communications interface to provide signals collected by sensor tool 2905 to the surface over a standard communication mechanism for operating in a well, where these collected signals are analyzed at a processing unit at the surface. Logging cable 2974 may be realized as a wireline (multiple power and communication lines), a mono-cable (a single conductor), and/or a slick-line (no conductors for power or communications), or other appropriate structure for use in bore hole 2912.

During drilling operations, the drill string 2908 can be rotated by the rotary table 2907. In addition to, or alternatively, the bottom hole assembly 2920 can also be rotated by a motor (e.g., a mud motor) that is located downhole. The drill collars 2915 can be used to add weight to the drill bit 2926. The drill collars 2915 also can stiffen the bottom hole assembly 2920 to allow the bottom hole assembly 2920 to transfer the added weight to the drill bit 2926, and in turn, assist the drill bit 2926 in penetrating the surface 2904 and subsurface formations 2914.

During drilling operations, a mud pump 2932 can pump drilling fluid (sometimes known by those of skill in the art as "drilling mud") from a mud pit 2934 through a hose 2936 into the drill pipe 2918 and down to the drill bit 2926. The drilling fluid can flow out from the drill bit 2926 and be returned to the surface 2904 through an annular area 2940 between the drill pipe 2918 and the sides of the borehole 2912. The drilling fluid may then be returned to the mud pit 2934, where such fluid is filtered. In some embodiments, the drilling fluid can be used to cool the drill bit 2926, as well as to provide lubrication for the drill bit 2926 during drilling operations. Additionally, the drilling fluid may be used to remove subsurface formation 2914 cuttings created by operating the drill bit 2926.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A system to measure signals indicative of properties downhole, the apparatus comprising:
    a tool having an arrangement of transmitters and receivers along a longitudinal axis of the tool to capture, when the tool is disposed downhole, signals from a first downhole region in response to activation of the transmitters; and
    a control unit to control activation of the transmitters and signal acquisition of the receivers to process signals received from the receivers, wherein the placement of the transmitters and receivers with respect to each other is such that signal contributions from a second downhole region in the vicinity of the tool are substantially canceled by the control unit structured to process a specified combination of the signals received from the receivers, based on the placement of the transmitters and receivers with respect to each other, the placement correlated to location of the first and second downhole regions relative to the tool.

2. The system of claim 1, wherein the first region is one of around the tool or ahead of the tool, and the second region is, respectively, the other of ahead of the tool or around the tool.

3. The system of claim 1, wherein the arrangement of transmitters and receivers is structured to capture a signal from anomalies ahead of the tool such that contributions from direct transmitter-to-receiver signals and formation signals around the tool can be substantially canceled.

4. The system of claim 3, wherein the arrangement of transmitters and receivers includes:
    a first transmitter/receiver pair arranged as a transmitter antenna tilted with respect to the longitudinal axis of the tool and a receiver antenna tilted with respect to the longitudinal axis of the tool such that the transmitter antenna and the receiver antenna are separated by a first distance; and
    a second transmitter/receiver pair arranged as a transmitter antenna tilted with respect to the longitudinal axis of the tool and a receiver antenna tilted with respect to the longitudinal axis of the tool such that the transmitter antenna and the receiver antenna are separated by a second distance, the second distance equal to the first distance.

5. The system of claim 1, wherein the arrangement of transmitters and receivers is structured such that signal contributions from anomalies ahead of the tool can be substantially canceled.

6. The system of claim 5, wherein the arrangement of transmitters and receivers includes:
a first transmitter/receiver pair arranged as a transmitter antenna tilted with respect to the longitudinal axis of the tool and a receiver antenna tilted with respect to the longitudinal axis of the tool such that the transmitter antenna is separated from a reference cross-section of the tool by a first distance and the receiver antenna is separated from the reference cross-section of the tool by a second distance; and
a second transmitter/receiver pair arranged as a transmitter antenna tilted with respect to the longitudinal axis of the tool and a receiver antenna tilted with respect to the longitudinal axis of the tool such that the transmitter antenna is separated from the reference cross-section of the tool by a third distance and the receiver is separated from the reference cross-section of the tool by a fourth distance, the sum of the first and second distances equals the sum of the third and fourth distances.

7. The system of claim 1, wherein the arrangement of transmitters and receivers is structured to capture a signal from around the tool such that a horizontal resistivity signal can be substantially decoupled from a vertical resistivity signal.

8. The system of claim 7, wherein the arrangement of transmitters and receivers includes:
a pair of transmitter antennas, each transmitter antenna tilted with respect to the longitudinal axis of the tool such that center points of the transmitter antennas are collocated, one transmitter antenna of the pair of transmitter antennas having a same tilt elevation angle and opposite tilt azimuth angle as the other transmitter antenna of the pair; and
a pair of receiver antennas, each receiver antenna tilted with respect to the longitudinal axis of the tool such that center points of the receiver antennas are collocated, one receiver antenna of the pair of receiver antennas having a same tilt elevation angle and opposite tilt azimuth angle as the other receiver antenna of the pair.

9. The system of claim 1, wherein the arrangement of transmitters and receivers is structured to capture a signal from anomalies ahead of the tool such that contributions from direct transmitter-to-receiver signals and formation signals around the tool can be substantially canceled and structured such that signal contributions from anomalies ahead of the tool can be substantially canceled.

10. The system of claim 9, wherein the arrangement of transmitters and receivers includes:
a first transmitter/receiver pair arranged as a transmitter antenna tilted with respect to the longitudinal axis of the tool and a receiver antenna tilted with respect to the longitudinal axis of the tool such that the transmitter antenna and the receiver antenna are separated by a separation distance; and
a second transmitter/receiver pair arranged as a transmitter antenna tilted with respect to the longitudinal axis of the tool and a receiver antenna tilted with respect to the longitudinal axis of the tool such that the transmitter antenna and the receiver antenna are separated by the separation distance, the first transmitter/receiver pair separated from the second transmitter/receiver pair by the separation distance.

11. The system of claim 9, wherein the arrangement of transmitters and receivers includes:
a transmitter/transmitter pair arranged as a first transmitter antenna separated from a second transmitter antenna by a first distance, both transmitter antennas tilted with respect to the longitudinal axis of the tool;
a receiver/receiver pair arranged as a first receiver antenna separated from a second receiver antenna by the first distance, both receiver antennas tilted with respect to the longitudinal axis of the tool, the transmitter/transmitter pair separated from the receiver/receiver pair by a second distance.

12. The system of claim 9, wherein the arrangement of transmitters and receivers includes:
a first transmitter/transmitter pair arranged as a first transmitter antenna separated from a second transmitter antenna by a first distance, both transmitter antennas tilted with respect to the longitudinal axis of the tool;
a second transmitter/transmitter pair arranged as a third transmitter antenna separated from a fourth transmitter antenna by the first distance, both transmitter antennas tilted with respect to the longitudinal axis of the tool; and
a receiver/receiver pair arranged as a first receiver antenna separated from a second receiver antenna by the first distance, both receiver antennas tilted with respect to the longitudinal axis of the tool, the receiver/receiver pair disposed between the first transmitter/transmitter pair and the second transmitter/transmitter pair such that the receiver/receiver pair is separated from the first transmitter/transmitter pair and from the second transmitter/transmitter pair by a second distance.

13. The system of claim 9, wherein the arrangement of transmitters and receivers includes:
a first pair of transmitter antennas, each transmitter antenna of the first pair of transmitter antennas tilted with respect to the longitudinal axis of the tool such that center points of the transmitter antennas of the first pair of transmitter antennas are collocated, one transmitter antenna of the first pair of transmitter antennas having a same tilt elevation angle and opposite tilt azimuth angle as the other transmitter antenna of the first pair of transmitter antennas;
a second pair of transmitter antennas, each transmitter antenna of the second pair of transmitter antennas tilted with respect to the longitudinal axis of the tool such that center points of the transmitter antennas of the second pair of transmitter antennas are collocated, one transmitter antenna of the second pair of transmitter antennas having a same tilt elevation angle and opposite tilt azimuth angle as the other transmitter antenna of the second pair of transmitter antennas;
a first pair of receiver antennas tilted with respect to the longitudinal axis of the tool such that center points of the receiver antennas of the first pair of receiver antennas are collocated, one receiver antenna of the first pair of receiver antennas having a same tilt elevation angle and opposite tilt azimuth angle as the other receiver antenna of the first pair of receiver antennas; and
a second pair of receiver antennas tilted with respect to the longitudinal axis of the tool such that center points of the receiver antennas of the second pair of receiver antennas are collocated, one receiver antenna of the second pair of receiver antennas having a same tilt elevation angle and opposite tilt azimuth angle as the other receiver antenna of the second pair of receiver antennas, such that the first pair of receiver antennas is separated from the first pair of transmitter antennas by a separation distance, the second pair of transmitter antennas is separated from the first pair of receiver antennas by the separation distance, and the second pair of receiver antennas is separated from the second pair of transmitter antennas by the separation distance.

14. The system of claim 13, wherein the first pair of receiver antennas is disposed between the first and second pairs of transmitter antennas.

15. The system of claim 9, wherein the arrangement of transmitters and receivers includes:
a first pair of transmitter antennas, each transmitter antenna of the first pair of transmitter antennas tilted with respect to the longitudinal axis of the tool such that center points of the transmitter antennas of the first pair of transmitter antennas are collocated, one transmitter antenna of the first pair of transmitter antennas having a same tilt elevation angle and opposite tilt azimuth angle as the other transmitter antenna of the first pair of transmitter antennas;
a second pair of transmitter antennas, each transmitter antenna of the second pair of transmitter antennas tilted with respect to the longitudinal axis of the tool such that center points of the transmitter antennas of the second pair of transmitter antennas are collocated, one transmitter antenna of the second pair of transmitter antennas having a same tilt elevation angle and opposite tilt azimuth angle as the other transmitter antenna of the second pair of transmitter antennas, the second pair of transmitter antennas being separated from the first pair of transmitter antennas by a first distance;
a first pair of receiver antennas, each receiver antenna of the first pair of receiver antennas tilted with respect to the longitudinal axis of the tool such that center points of the receiver antennas of the first pair of receiver antennas are collocated, one receiver antenna of the first pair of receiver antennas having a same tilt elevation angle and opposite tilt azimuth angle as the other receiver antenna of the first pair of receiver antennas; and
a second pair of receiver antennas, each receiver antenna of the second pair of receiver antennas tilted with respect to the longitudinal axis of the tool such that center points of the receiver antennas of the second pair of receiver antennas are collocated, one receiver antenna of the second pair of receiver antennas having a same tilt elevation angle and opposite tilt azimuth angle as the other receiver antenna of the second pair of receiver antennas, the second pair of receiver antennas being separated from the first pair of receiver antennas by the first distance, the first and second pairs of receiver antennas being separated from the first and second pairs of transmitter antennas such that neither of the pairs of receiver antennas are placed between the pairs of transmitter antennas.

16. The system of claim 1, wherein the arrangement of transmitters and receivers includes:
a first transmitter antenna tilted with respect to the longitudinal axis of the tool;
a second transmitter antenna tilted with respect to the longitudinal axis of the tool;
a third transmitter antenna tilted with respect to the longitudinal axis of the tool;
a first pair of receiver antennas, each receiver antenna of the first pair of receiver antennas tilted with respect to the longitudinal axis of the tool, the receiver antennas of the first pair of receiver antennas separated from each other by a first distance, the first pair of receiver antennas disposed between the first transmitter antenna and the second transmitter antenna and separated from both the first transmitter antenna and the second transmitter antenna by a second distance; and
a second pair of receiver antennas, each receiver antenna of the second pair of receiver antennas tilted with respect to the longitudinal axis of the tool, the receiver antennas of the second pair of receiver antennas separated from each other by the first distance, the second pair of receiver antennas disposed between the second transmitter antenna and the third transmitter antenna and separated from both the second transmitter antenna and the third transmitter antenna by the second distance.

17. The system of claim 1, wherein the arrangement of transmitters and receivers includes:
a first receiver antenna tilted with respect to the longitudinal axis of the tool;
a second receiver antenna tilted with respect to the longitudinal axis of the tool, the second receiver antenna separated from the first receiver antenna by a first distance;
a third receiver antenna tilted with respect to the longitudinal axis of the tool, the third receiver antenna separated from the second receiver antenna by the first distance;
a first pair of transmitter antennas, each transmitter antenna of the first pair of transmitter antennas tilted with respect to the longitudinal axis of the tool, the transmitter antennas of the first pair of transmitter antennas separated from each other by the first distance; and
a second pair of transmitter antennas, each transmitter antenna of the second pair of transmitter antennas tilted with respect to the longitudinal axis of the tool, the transmitter antennas of the second pair of transmitter antennas separated from each other by the first distance, the second pair of transmitter antennas separated from the first pair of transmitter antennas by the first, second, and third receiver antennas.

18. The system of claim 1, wherein the control unit is integrated with the tool such that the control unit is operable downhole.

19. A method of measuring properties downhole, the method comprising:
controlling activation of a tool disposed downhole, the tool having an arrangement of transmitters and receivers along a longitudinal axis of the tool to capture signals from formations in the vicinity of the tool;
obtaining an ahead-of-tool signal such that contributions from direct transmitter-to-receiver signals and formation signals around the tool are substantially canceled by operation of a controller processing a specified combination of signals received from the receivers, based on the arrangement of the transmitters and receivers with respect to each other;
obtaining an at-the-tool signal such that signal contributions from anomalies ahead of the tool are substantially canceled by operation of the controller processing another specified combination of signals received from the receivers, based on the arrangement of the transmitters and receivers with respect to each other;
performing an inversion operation of the at-the-tool signal to determine a property of the formation around the tool; and
performing an inversion operation of the ahead-of-tool signal using the determined property of the formation around the tool to determine one or more properties of the formation ahead of the tool.

20. The method of claim 19, wherein performing an inversion operation of the at-the-tool signal includes determining formation resistivity from around the tool.

21. The method of claim 19, wherein performing an inversion operation of the ahead-of-tool signal using the determined property of the formation around the tool includes determining resistivity from anomalies ahead of the tool.

22. The method of claim 19, wherein performing an inversion operation of the ahead-of-tool signal using the determined property of the formation around the tool includes applying a forward model subjected to an iterative process.

23. The method of claim 19, wherein controlling activation of the tool includes applying signals to transmitters of the tool electrically, in correlated magnitudes and polarity, to perform subtraction and/or addition operations.

24. The method of claim 19, wherein controlling activation of the tool includes applying current to two different transmitters of the tool simultaneously such that the current applied to one of the two transmitters is of a same amount as and of opposite direction to the current applied to the other transmitter.

25. The method of claim 19, wherein the method includes applying results from the determination of the one or more properties of the formation ahead of the tool to steering a drilling operation.

26. The method of claim 19, wherein the method includes stopping a drilling operation to make measurements using the tool.

27. The method of claim 19, wherein the method includes monitoring resistivity from ahead of a drill bit located ahead of the tool and correlating resistivity changes, determined from the monitoring, to determine changes in pressure ahead of the drill bit.

28. The method of claim 19, wherein the performing of the inversion of the at-the-tool signal includes obtaining horizontal resistivity and vertical resistivity of a formation and the performing of the inversion of the ahead-of-tool signal includes obtaining elevation angle and distance to an anomaly.

29. An apparatus to measure properties downhole, the apparatus comprising:
a tool having an arrangement of transmitters and receivers along a longitudinal axis of the tool; and
a control unit to control activation of the transmitters of the tool and to process signals received from receivers in the tool, wherein the control unit includes a non-transitory machine-readable storage medium having instructions stored thereon, which when executed by a processor, cause the apparatus to perform operations, the operations comprising operations to:
control activation of the tool disposed downhole to capture signals from formations in the vicinity of the tool;
obtain an ahead-of-tool signal such that contributions from direct transmitter-to-receiver signals and formation signals around the tool are substantially canceled by operation of the control unit processing a specified combination of signals received from the receivers, based on the arrangement of the transmitters and receivers with respect to each other;
obtain an at-the-tool signal such that signal contributions from anomalies ahead of the tool are substantially canceled by operation of the control unit processing another specified combination of signals received from the receivers, based on the arrangement of the transmitters and receivers with respect to each other;
perform an inversion operation of the at-the-tool signal to determine a property of the formation around the tool; and
perform an inversion operation of the ahead-of-tool signal using the determined property of the formation around the tool to determine one or more properties of the formation ahead of the tool.

30. The apparatus of claim 29, wherein instructions to perform the inversion operation of the at-the-tool signal include determining formation resistivity from around the tool.

31. The apparatus of claim 29, wherein instructions to perform the inversion operation of the ahead-of-tool signal using the determined property of the formation around the tool include determining resistivity from anomalies ahead of the tool.

32. The apparatus of claim 29, wherein instructions to perform the inversion operation of the ahead-of-tool signal using the determined property of the formation around the tool include applying a forward model subjected to an iterative process.

33. The apparatus of claim 29, wherein instructions to control activation of the tool include applying signals to transmitters of the tool electrically, in correlated magnitudes and polarity, to perform subtraction and/or addition operations.

34. The apparatus of claim 29, wherein instructions to control activation of the tool include applying current to two different transmitters of the tool simultaneously such that the current applied to one of the two transmitters is of a same amount as and of opposite direction to the current applied to the other transmitter.

35. The apparatus of claim 29, wherein instructions include applying results from the determination of the one or more properties of the formation ahead of the tool to steering a drilling operation.

36. The apparatus of claim 29, wherein the instructions include stopping a drilling operation to make measurements using the tool.

37. The apparatus of claim 29, wherein instructions include monitoring resistivity from ahead of a drill bit located ahead of the tool and correlating resistivity changes, determined from the monitoring, to determine changes in pressure ahead of the drill bit.

38. The apparatus of claim 29, wherein instructions to perform the inversion of the at-the-tool signal include obtaining horizontal resistivity and vertical resistivity of a formation and the performing of the inversion of the ahead-of-tool signal includes obtaining elevation angle and distance to an anomaly.

39. A non-transitory machine-readable storage medium having instructions stored thereon, which, when performed by a machine, cause the machine to perform operations, the operations comprising:
controlling activation of a tool disposed downhole, the tool having an arrangement of transmitters and receivers along a longitudinal axis of the tool to capture signals from formations in the vicinity of the tool;
obtaining an ahead-of-tool signal such that contributions from direct transmitter-to-receiver signals and formation signals around the tool are substantially canceled by operation of a controller processing a specified combination of si' nals received from the receivers, based on the arrangement of the transmitters and receivers with respect to each other;

obtaining an at-the-tool signal such that signal contributions from anomalies ahead of the tool are substantially canceled by operation of the controller processing another specified combination of signals received from the receivers, based on the arrangement of the transmitters and receivers with respect to each other;

performing an inversion operation of the at-the-tool signal to determine a property of the formation around the tool; and performing an inversion operation of the ahead-of-tool signal using the determined property of the formation around the tool to determine one or more properties of the formation ahead of the tool.

40. The non-transitory machine-readable storage medium of claim 39, wherein performing an inversion operation of the at-the-tool signal includes determining formation resistivity from around the tool.

41. The non-transitory machine-readable storage medium of claim 39, wherein performing the inversion operation of the ahead-of-tool signal using the determined property of the formation around the tool includes determining resistivity from anomalies ahead of the tool.

42. The non-transitory machine-readable storage medium of claim 39, wherein performing the inversion operation of the ahead-of-tool signal using the determined property of the formation around the tool includes applying a forward model subjected to an iterative process.

43. The non-transitory machine-readable storage medium of claim 39, wherein controlling activation of the tool includes applying signals to transmitters of the tool electrically, in correlated magnitudes and polarity, to perform subtraction and/or addition operations.

44. The non-transitory machine-readable storage medium of claim 39, wherein controlling activation of the tool includes applying current to two different transmitters of the tool simultaneously such that the current applied to one of the two transmitters is of a same amount as and of opposite direction to the current applied to the other transmitter.

45. The non-transitory machine-readable storage medium of claim 39, wherein the instructions include applying results from the determination of the one or more properties of the formation ahead of the tool to steering a drilling operation.

46. The non-transitory machine-readable storage medium of claim 39, wherein the instructions include stopping a drilling operation to make measurements using the tool.

47. The non-transitory machine-readable storage medium of claim 39, wherein the instructions include monitoring resistivity from ahead of a drill bit located ahead of the tool and correlating resistivity changes, determined from the monitoring, to determine changes in pressure ahead of the drill bit.

48. The non-transitory machine-readable storage medium of claim 39, wherein performing the inversion of the at-the-tool signal includes obtaining horizontal resistivity and vertical resistivity of a formation and the performing of the inversion of the ahead-of-tool signal includes obtaining elevation angle and distance to an anomaly.

* * * * *